(12) United States Patent
Bourque et al.

(10) Patent No.: US 9,426,342 B1
(45) Date of Patent: Aug. 23, 2016

(54) HANDHELD ELECTRONIC MAGNIFIER HAVING A MULTI-ORIENTATION HANDLE

(71) Applicant: TECHNOLOGIES HUMANWARE INC., Drummondville (Québec) (CA)

(72) Inventors: Georges Bourque, Drummondville (CA); Patrick De Grasse, Drummondville (CA); Louis-Philippe Massé, Drummondville (CA); Carle Auclair, Drummondville (CA); Pierre Hamel, Drummondville (CA)

(73) Assignee: Technologies Humanware Inc. (CA)

( * ) Notice: Subject to any disclaimer, the term of this patent is extended or adjusted under 35 U.S.C. 154(b) by 0 days.

(21) Appl. No.: 14/819,218

(22) Filed: Aug. 5, 2015

(51) Int. Cl.
*H04N 5/225* (2006.01)

(52) U.S. Cl.
CPC .................................... *H04N 5/2252* (2013.01)

(58) Field of Classification Search
CPC ....... H04N 5/2252; H04N 7/18; H04N 1/195; H04N 1/19594; H04N 5/2256; H04N 2201/045; H04N 2201/0436; H04N 1/00129; H04N 5/23296; H04N 5/23293; H04N 2101/00; G03B 17/12; G03B 17/55; G03B 15/03; G03B 17/04
See application file for complete search history.

(56) References Cited

U.S. PATENT DOCUMENTS

| | | | |
|---|---|---|---|
| D502,200 S * | 2/2005 | Abe | D16/200 |
| 6,956,616 B2 * | 10/2005 | Jung | G02B 25/02 348/370 |
| D614,220 S | 4/2010 | Goldenberg | |
| D624,107 S | 9/2010 | Goldenberg | |
| 8,259,222 B2 | 9/2012 | Rodriguez et al. | |
| 8,264,598 B2 | 9/2012 | Rodriguez et al. | |
| D676,889 S * | 2/2013 | Dinger | D16/219 |
| 2006/0072033 A1 * | 4/2006 | Oran | H04N 5/2251 348/376 |
| 2006/0268569 A1 * | 11/2006 | Rodriguez | H04N 7/183 362/561 |
| 2007/0223906 A1 * | 9/2007 | Hanney | G03B 15/03 396/155 |

(Continued)

FOREIGN PATENT DOCUMENTS

| | | |
|---|---|---|
| WO | 2006127105 A1 | 11/2006 |
| WO | 2007109337 A2 | 9/2007 |

(Continued)

OTHER PUBLICATIONS

Freedom Scientific, Ruby Handheld Video Magnifier.

*Primary Examiner* — Aung S Moe
(74) *Attorney, Agent, or Firm* — Hovey Williams LLP

(57) ABSTRACT

A handheld electronic magnifier for providing a magnified representation of an object is provided. The magnifier includes a casing having a camera face and an opposed display face, a camera inside the casing for acquiring an image of the object, and a display extending along the display face for displaying the magnified representation of the object based on the image acquired by the camera. The handheld electronic magnifier also includes a handle and a two-axis hinge assembly rotatably connecting the casing and the handle about orthogonal first and second hinge axes extending respectively along a length of the casing and a width of the handle. The two-axis hinge assembly includes a longitudinal and a transverse hinge member rigidly fixed to each other and extending along the first and second hinge axes, respectively. The longitudinal and transverse hinge members are rotatably connected to the casing and the handle, respectively.

15 Claims, 20 Drawing Sheets

(56) References Cited

U.S. PATENT DOCUMENTS

| | | | |
|---|---|---|---|
| 2010/0026855 A1* | 2/2010 | Conard | H04N 1/195 348/240.99 |
| 2010/0027237 A1 | 2/2010 | Rodriquez et al. | |
| 2010/0073515 A1* | 3/2010 | Conard | G09B 21/008 348/229.1 |
| 2012/0307026 A1* | 12/2012 | Rodriguez | H04N 1/00129 348/63 |
| 2013/0208161 A1* | 8/2013 | Yoon | G02B 25/002 348/308 |
| 2014/0022364 A1* | 1/2014 | Rodriguez | G03B 17/04 348/63 |
| 2014/0118799 A1* | 5/2014 | Van Der Snoek | H04N 1/19594 358/473 |
| 2014/0176767 A1* | 6/2014 | Hamel | H04N 5/23296 348/240.2 |

FOREIGN PATENT DOCUMENTS

| | | |
|---|---|---|
| WO | 2010141707 A1 | 12/2010 |
| WO | 2014014756 A1 | 1/2014 |

* cited by examiner

HANDHELD ELECTRONIC MAGNIFIER HAVING A MULTI-ORIENTATION HANDLE

TECHNICAL FIELD

The technical field generally relates to devices for low-vision and visually impaired individuals, and more particularly, to a handheld electronic magnifier having a multi-orientation rotatable handle.

BACKGROUND

Loss of visual acuity is a growing concern worldwide. The World Health Organization currently estimates to 2.5% the incidence of low vision in industrialized countries, with this figure expected to continue increasing with ageing population. Low vision may be generally referred to as a condition where ordinary eye glasses, lens implants or contact lenses are not sufficient for providing sharp sight. The largest growing segment of the low-vision population in developed countries is expected to be people aged 65 years old and older, most notably due to age-related eye diseases such as, for example, macular degeneration, glaucoma and diabetic retinopathy, cataract, detached retina, and retinitis pigmentosa. Some people are also born with low vision.

Low-vision and other visually impaired individuals often find it difficult or exhausting to read small writing or to discern small objects without high levels of magnification and/or without enhanced contrast. This limits their ability to lead an independent life because optical magnifiers such as reading and magnifying glasses are typically characterized by fixed magnification ratios and a lack of contrast enhancement capabilities, while being generally limited in terms of functionality. In order to assist low-vision individuals in performing daily tasks, various magnification and contrast-enhancing devices and systems are known in the art, including portable and handheld electronic magnifiers.

Handheld electronic magnifiers are magnifying and contrast-enhancing devices that are small and light enough to be readily carried and held in a user's hand or hands while being used or operated. These devices typically include a camera on one side and a display on the opposite side. Recently, handheld electronic magnifiers with a rotatable handle have been developed that are operable in various operation modes by bringing the handle into different orientations relative to a base unit of the magnifier. The rotation of the handle is intended to provide good ergonomics when the device is used while maintaining a compact form when the device is to be stored or transported. While these currently available handheld electronic magnifiers may have certain advantages, like compactness, they also have some drawbacks related to, for example, the ergonomics of the handle, the ease with which the handle is rotated between its different orientations, and the mechanical stability of the magnifier when the handle is grasped by the user in a deployed configuration.

Accordingly, various challenges exist in the development of multi-configuration handheld electronic magnifiers that can be used more easily and conveniently by low-vision individuals.

SUMMARY

According to an aspect of the invention, there is provided a handheld electronic magnifier for providing a magnified representation of an object. The handheld electronic magnifier includes:

a casing having a camera face and an opposed display face;

a camera provided inside the casing and having a field of view extending from the camera face, the camera being configured to acquire an image of the object within the field of view;

a display extending along the display face and configured to display the magnified representation of the object based on the image acquired by the camera;

a handle; and a two-axis hinge assembly rotatably connecting the casing and the handle about a first hinge axis and a second hinge axis perpendicular to each other and extending respectively along a length of the casing and a width of the handle. The two-axis hinge assembly includes:

a longitudinal hinge member extending along the first hinge axis and rotatably connected to the casing to enable rotation of the handle about the first hinge axis toward and away from the camera face; and a transverse hinge member extending along the second hinge axis and rigidly fixed to the longitudinal hinge member, the transverse hinge member being rotatably connected to the handle to enable rotation of the handle about the second hinge axis.

Other features and advantages of the embodiments of the present invention will be better understood upon reading of exemplary embodiments thereof with reference to the appended drawings.

BRIEF DESCRIPTION OF THE DRAWINGS

In FIG. 4, the handle is shown in phantom ines to better illustrate its connection to the second detent mechanism.

DETAILED DESCRIPTION

Figure 1:
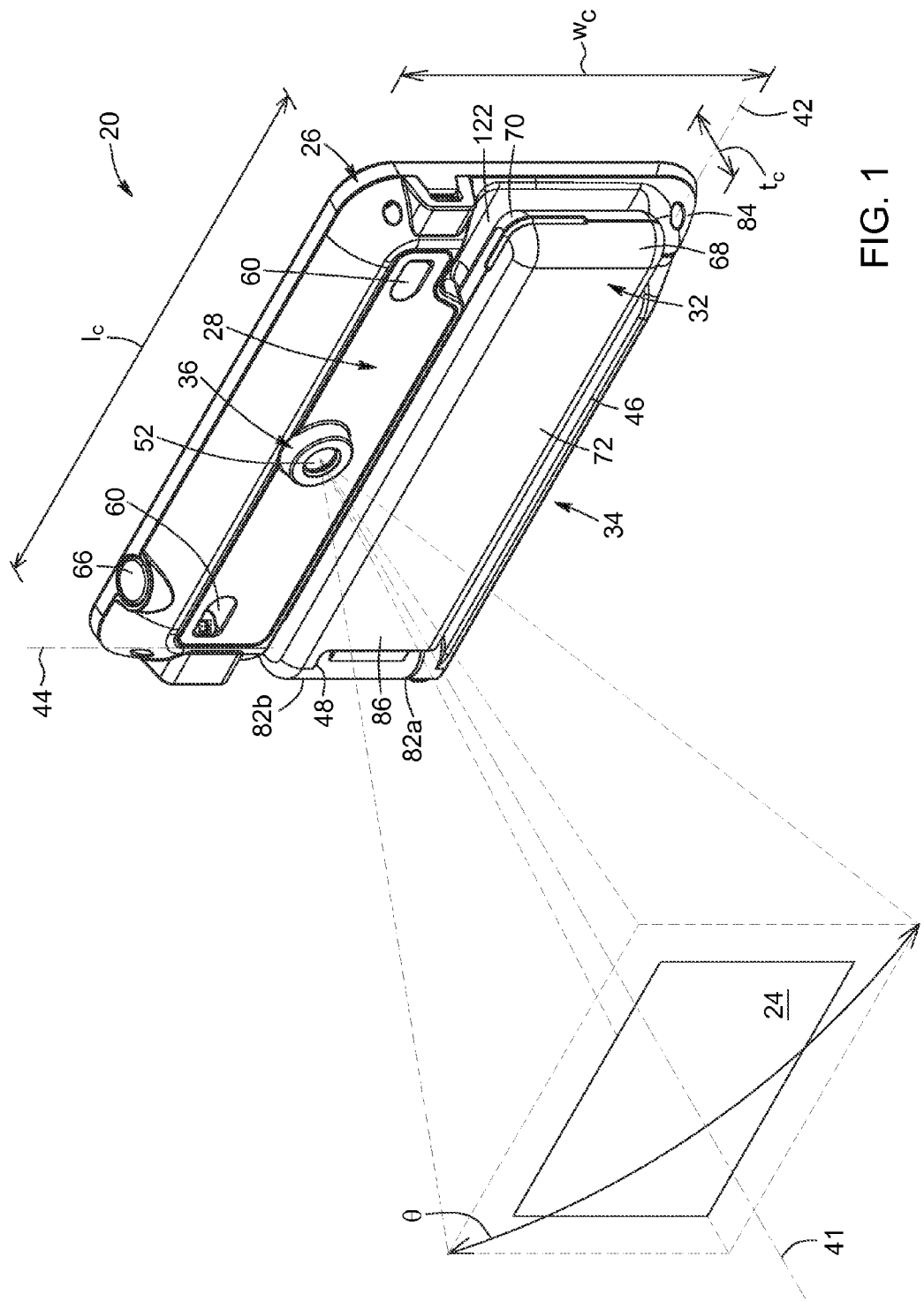
FIG. 1 is a perspective view of a handheld electronic magnifier in accordance with an embodiment, illustrating the camera face of the handheld electronic magnifier, and wherein the handle is the closed position and in the retracted state.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

The present description generally relates to a handheld electronic magnifier having a multi-orientation rotatable handle and configured for displaying a magnified representation of an object. It is to be noted that, for simplicity, the expression "handheld electronic magnifier" may, in some instances, be shortened to "handheld magnifier", "electronic magnifier" or simply "magnifier". Likewise, the term "magnifier" may, in some instances, be replaced with "magnifying device" or "magnification device".

Referring to FIGS. 1 to 5, and as discussed further below, an exemplary embodiment of a handheld electronic magnifier 20 for providing a magnified representation 22 of an object 24 is illustrated. Broadly described, the handheld magnifier 20 includes: a casing 26 having a camera face 28 and an opposed display face 30; a handle 32 rotatably connected to the casing 26; a two-axis hinge assembly 34 rotatably connecting the handle 32 to the casing 26; a camera 36 inside the casing 26; and a display 38 extending along the display face 30. The camera 36 has a field of view 40 extending from the camera face 28 and is configured to acquire an image of the object 24 located within its field of view 40. The display 38 is configured to display the magnified representation 22 of the object 24 based on the image acquired by the camera 36.

The two-axis hinge assembly 34 enables relative rotational movement between the casing 26 and the handle 32 both about a first hinge axis 42 and a second hinge axis 44, where the relative rotation of the casing 26 and the handle 32 about one of the first and second hinge axes 42, 44 is independent of their relative rotation about the other one of the first and second hinge axes 42, 44. The first and second hinge axes 42, 44 are perpendicular to each other and extend respectively along a length $l_c$ of the casing 26 and a width $w_h$ of the handle 32.

The two-axis hinge assembly 34 includes a longitudinal hinge member 46 and a transverse hinge member 48, which extend along the first and the second hinge axis 42, 44, respectively. The longitudinal and transverse hinge members 46, 48 are rigidly fixed to, or integrally formed with, each other. The longitudinal hinge member 46 is rotatably connected to the casing 26 to enable rotation of the handle 32 about the first hinge axis 42 toward and away from the camera face 28. The transverse hinge member 48 is rotatably connected to the handle 32 to enable rotation of the handle 32 about the second hinge axis 44.

As also described further below, embodiments of the handheld electronic magnifier 20 can be operated according to a number of use modes by changing the relative orientation between the casing 26 and the handle 32. The use modes of the handheld magnifier 20 include:
 (i) a compact mode where the casing 26 and the handle 32 are folded inwardly toward each other to reduce or minimize the space occupied by the handheld magnifier 20 (see, e.g., FIGS. 1, 2 and 9);
 (ii) a desktop mode where the handle 32 is inclined relative to the casing 26 so as to be placed on a working surface and act as a stand for supporting the casing 26 at an angle above the working surface (see, e.g., FIGS. 10A to 10F); and
 (iii) a grasping mode where the handle 32 is rotated outwardly away from the casing 26 in order to be held by one of the user's hands (see, e.g., FIGS. 11A to 11D).

More regarding the different use modes of the handheld electronic magnifier 20 will be discussed further below.

The handheld electronic magnifiers described herein may be useful in applications where it is desirable or required to provide a magnification device having a multi-orientation handle that allows the device to be used in a number of viewing or use modes to provide sight enhancement and magnification to individuals suffering from low vision or other visual impairments. Terms such as "low-vision individuals" and "print-disabled individuals" are sometimes defined as referring to particular levels of visual acuity. However, those skilled in the art will recognize that the handheld electronic magnifiers described herein may be used by any person requiring or desiring a multi-configuration magnifier capable of magnifying text, images, physical objects, or other features of interest. In particular, in some embodiments, the handheld electronic magnifier may also be of use to sighted people that do not suffer from any visual impairment.

As used herein, the term "handheld" is intended to refer to an electronic magnifier that is both small and light enough to be readily carried by a user and be held in the user's hand or hands while being used or operated. In this regard, although the electronic magnifier may be held by the user while being operated, it may also be placed on a working surface and be used without being held or supported by the user. Moreover, although the handheld electronic magnifier can be used as a portable standalone unit, it may also be connected to and used in combination with stationary equipment. Accordingly, in some embodiments, the handheld electronic magnifier may be momentarily, or permanently, connected to one or more peripheral devices such as, for example, an external monitor, but also a personal computer, a tablet computer, a smartphone, and the like.

As used herein, the terms "connected", "coupled" and any variants thereof mean any connection or coupling, either direct or indirect, between two or more elements. The connection or coupling between the elements may be, without limitation, mechanical, electrical, optical, magnetic, operational, logical, or a combination thereof. By way of example, in the handheld magnifier devices described herein, the casing and the handle are rotatably connected to each other by means of the two-axis hinge assembly. It is also to be noted that data communication between connected or coupled elements may be wired, wireless, or a combination thereof.

As used herein, the term "magnification" is understood to refer to the ratio of the size of the image of the object displayed by the handheld electronic magnifier to the size of the object itself. It is noted that the term "representation", rather than "image", is used herein to designate the magnified output displayed by the handheld electronic magnifier. This is because in addition to providing an enlarged image of the object, the handheld electronic magnifier may further manipulate, format, treat, subject to contrast enhancement or otherwise process the enlarged image in order to yield the magnified representation of the object.

As used herein, the term "object" is meant to encompass any structure, feature or information of interest whose magnified representation is to be displayed. By way of example, in FIG. 1, the object 24 to be magnified is embodied by a sheet of paper having text and images printed thereon. However, in other embodiments, the object to be magnified may include, without limitation, tri-dimensional structures, handwritten or printed text, images, symbols, graphics, and any combination thereof. The object to be magnified may also include the hands or another body part of a person. Accordingly, in some scenarios, the handheld electronic magnifiers described herein may be used to provide a magnified representation of the hands of the user while he or she is performing manual tasks. Those skilled in the art will understand that the terminology "object" is not intended to be limiting.

More regarding various structural and operational features of the handheld electronic magnifier will now be described in greater detail.

Casing

Figure 2:
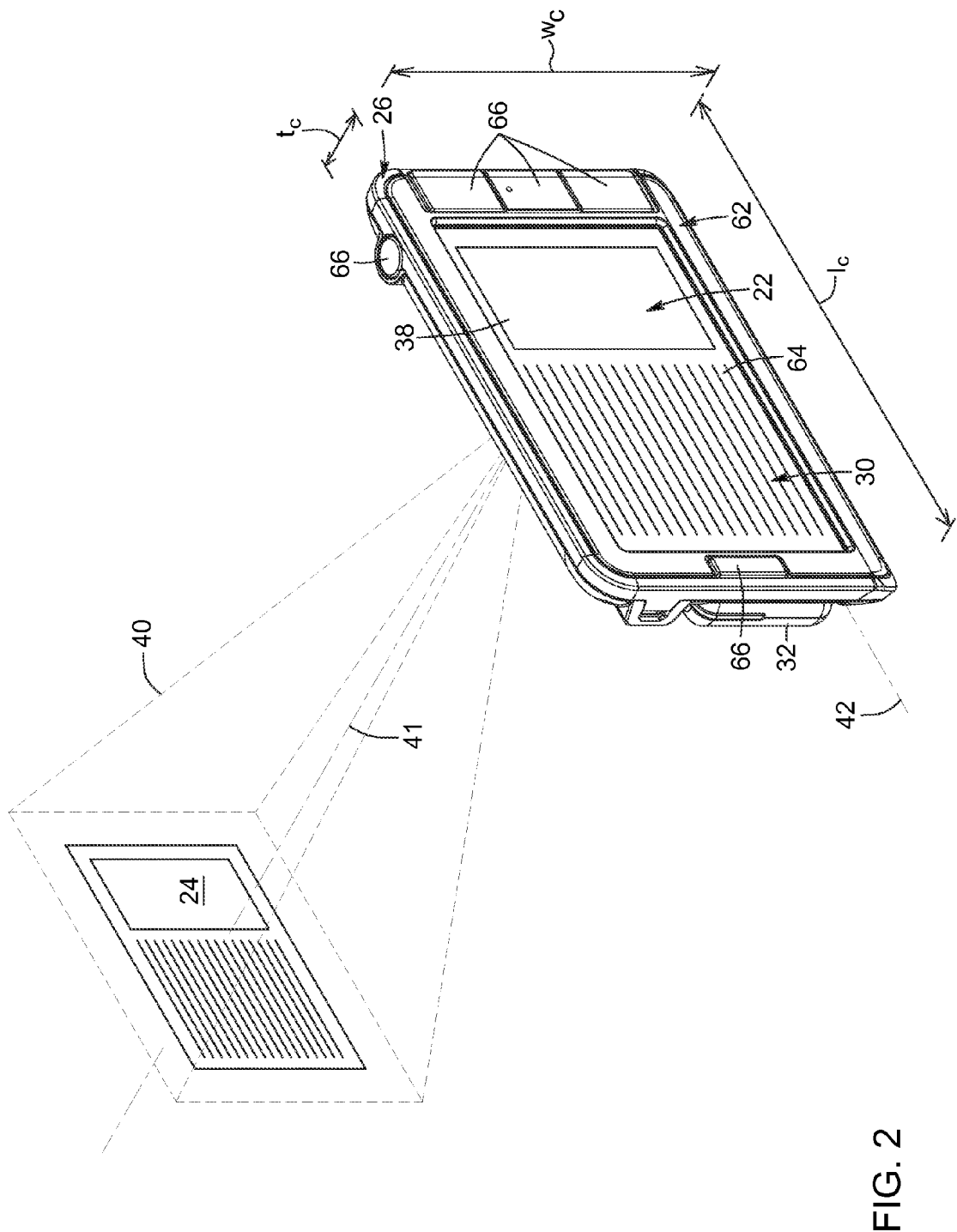
FIG. 2 is a perspective view of the handheld electronic magnifier of FIG. 1, illustrating the display face of the handheld electronic magnifier.

Referring to FIGS. 1 and 2, the handheld electronic magnifier 20 includes a casing 26 having a camera face 28 and a display face 30 opposed to the camera face 28. The casing 26 generally defines the overall shape of the handheld electronic magnifier 20 and supports, protects or otherwise houses a number of its internal components. Those skilled in the art will recognize that when the handheld electronic magnifier 20 is operated, the camera face 28 is generally directed toward the object 24, while the display face 30 is generally directed toward the user.

In some embodiments, the casing 26 may consist of a thin rectangular shell made of light yet sturdy and durable material including, without being limited to molded plastic or lightweight metals such as aluminum and magnesium alloys. The casing 26 may have an ergonomic shape (e.g. with rounded corners) and be lightweight to facilitate grasping and holding of the handheld electronic magnifier 20.

In the embodiment of FIGS. 1 and 2, the casing 26 is shaped generally as a rectangular prism whose three linear dimensions can be stated in terms of a length $l_c$, a width $w_c$ and a thickness $t_c$.

As used herein, the term "length" and variants thereof when referring to the casing designate a linear dimension that extends in a plane parallel to the camera or display face, generally along the long-side direction of the camera or display face.

As used herein, the term "width" and variants thereof when referring to the casing designate a linear dimension that extends in a plane parallel to the camera or display face, perpendicularly to the length of the casing and generally along the short-side direction of the camera or display face.

As used herein, the term "thickness" and variants thereof when referring to the casing designate a linear dimension that is perpendicular to both the camera and display faces, and thus to both the length and the width of the casing.

It will be understood that, in some embodiments, the length-to-thickness ratio and the width-to-thickness ratio can each be relatively large, so as to ensure that the handheld electronic magnifier is provided with a large enough display face while remaining sufficiently thin for ease of holding by a user and for ease of carrying in a purse or shirt pocket, for example.

The length $l_c$, width $w_c$ and thickness $t_c$ of the casing 26 may each be selected based on the particularities of a given application. For example, in FIGS. 1 and 2, $l_c$=139 mm, $w_c$=89 mm and $t_c$=21 mm. Of course, these dimensions are provided for exemplary purposes only and may differ in other embodiments. It will also be understood that while, in some embodiments, the casing 26 may assume a shape different than rectangular (e.g., circular, semi-circular, square, elliptical, oval, parallelepipedal or trapezoidal), it may still be described in terms of a length, a width and a thickness.

In the illustrated embodiment, the casing 26 houses a processing unit 50 (see FIG. 6), proximate the camera 36. It is noted that, in some embodiments, the portion of the casing 26 that houses the camera 36 and the processing unit 50 may be made of a material having a high thermal conductivity (e.g., lightweight metals such as aluminum and magnesium alloys) and acting as a heat sink to absorb and dissipate the heat generated by the camera 36 and processing unit 50.

Figure 6:
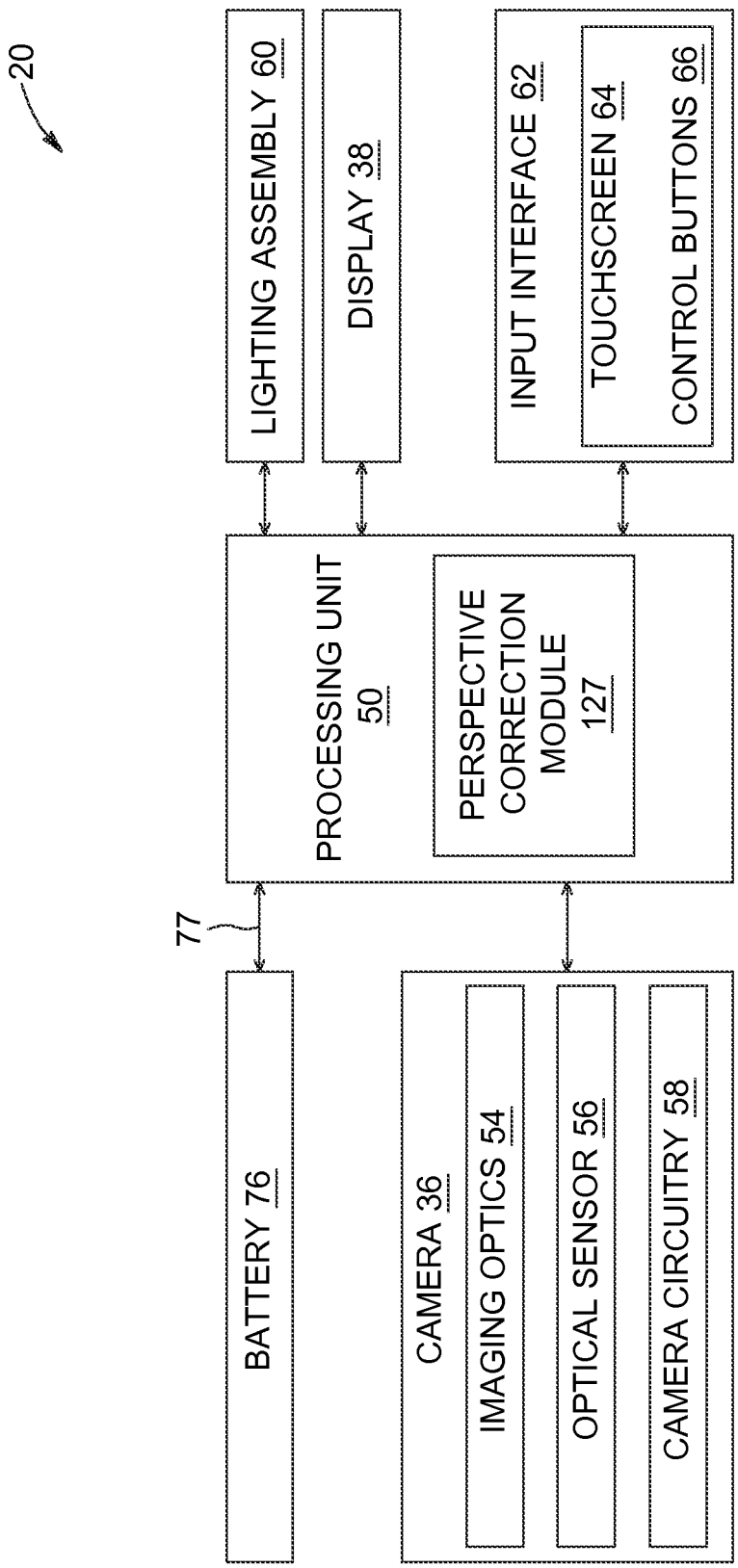
FIG. 6 is a schematic functional block diagram of the handheld electronic magnifier of FIG. 1.

As used herein, the term "processing unit" refers to a functional entity of the handheld electronic magnifier that controls and executes, at least partially, the operations required for generating, manipulating, formatting, displaying, storing or otherwise processing the magnified representation of the object based on the image thereof acquired by the camera. As illustrated in FIG. 6, the processing unit 50 may be connected to various components of the handheld magnifier 20 via various input/output (I/O) communication ports.

The processing unit 50 may be implemented as a single unit or as a plurality of interconnected processing sub-units. The processing unit 50 may be embodied by or be part of an image signal processor (ISP), a microprocessor, a central processing unit (CPU), a processing core, a microcontroller, a system on a chip (SoC), a digital signal processor (DSP), a programmable logic device, or by any other processing resource or any combination of such processing resources configured to operate collectively as a processing unit. The hardware and software components of the processing unit 50 and the interconnections therebetween can be disposed on an integrated circuit (IC) die, which can be mounted onto a printed circuit board (PCB).

Camera

Referring still to FIGS. 1 and 2, the handheld electronic magnifier 20 also includes a camera 36 provided inside the casing 26 and having a field of view 40 extending from the camera face 28. The camera 36 is configured to acquire an image of an object 24 located within its field of view 40.

As used herein, the term "camera" refers to any component or device capable of acquiring an image of an object of interest. Also, the term "field of view" refers to the solid angular extent of a given scene that is imaged by the camera. In the illustrated embodiment, the field of view 40 is depicted as a rectangular-based pyramid that widens outwardly with increasing distance from the camera face 28. The field of view 40 may be described by an angle θ characterizing its extent and by an optical axis 41 that coincides with the optical axis of the camera 36. By way of example, in one embodiment, the camera 36 may have for example a field of view 40 of about 70 degrees.

Referring still to FIGS. 1 and 2, in conjunction with FIG. 6, the camera 36 includes a camera aperture 52, imaging optics 54, an optical sensor 56 and camera circuitry 58. A transparent window (not shown) covering the camera aperture 52 may be provided to protect exposed camera components. The camera aperture 52 extends through the camera face 28 and allows light emanating from the object 24 to pass therein and be collected by the imaging optics 54. As used herein, the terms "light", "optical" and any variants thereof are meant to encompass radiation in any appropriate region of the electromagnetic spectrum.

The term "imaging optics" refers herein to one or more optical components of the camera adapted to collect light from a scene viewed by the camera and to direct this collected light onto the optical sensor. The imaging optics 54 may include lenses, mirrors, filters, polarizers, and other refractive, reflective and/or diffractive optical components. The imaging optics 54 may provide an optical magnification of the image of the object 24 that is projected onto the optical sensor 56.

The optical sensor 56 may be embodied by any photosensitive device able to detect light emanating from the object and to generate therefrom an image of the object. In some embodiments, the optical sensor 56 is adapted to detect light from the object collected by the imaging optics 54 and to convert the detected light into electrical data representing an image of the object. The optical sensor 56 may be composed of an array of light-sensitive elements, referred to as pixels, the number of which defines the resolution of the camera 36. The optical sensor 56 may be embodied by a charge-coupled device (CCD) pixel sensor, a complementary metal-oxide-semiconductor (CMOS) pixel sensor or another suitable sensor type. In some embodiments, the optical sensor 56 has a resolution of at least 0.9 megapixel. By way of example, in one embodiment, the optical sensor 56 has a resolution of 5 megapixels corresponding to an array size of 2592×1944 pixels. Although, in some embodiments, the camera 36 may be a high-resolution digital camera, lower resolution cameras or non-digital devices may also be used in other embodiments.

As used herein, the term "camera circuitry" designates electronic components that receive the electrical data representing the image of the object from the optical sensor 56, and process this image in a usable format. Those skilled in the art will appreciate that, in practice, the camera circuitry may include a plurality of modules, components, communication ports, software and the like cooperating together in order to process the image of the object received from the optical sensor.

Referring to FIG. 1, the handheld electronic magnifier 20 may optionally include a lighting assembly 60 to project light within the field of view 40 of the camera 36 for illuminating the object 24 while images thereof are acquired. In the illustrated embodiment, the lighting assembly 60 includes a pair of lighting elements located on each side of the camera aperture 52. By way of example, the lighting elements may be embodied by light-emitting diodes (LEDs).

Display

Referring to FIG. 2, the handheld electronic magnifier 20 also includes a display 38 extending along the display face 30 and configured to display the magnified representation 22 of the object 24 based on the image acquired by the camera. It will be understood that, in some embodiments, it may be desirable or required that the magnified representation 22 of the object 24 be displayed to the user in rear-time, that is, without appreciable time lag on the typical scale of human perception, in order to provide a seamless user experience.

In an exemplary embodiment, the display 38 may have a diagonal measurement of about 5 inches and a resolution of at least 0.48 megapixel, corresponding to an array of 800×600 pixels. Of course, these values are provided for illustrative purposes only and can vary in other embodiments. The display 38 may use liquid crystal display (LCD) technology, although another display technology such as, for example, organic LED (OLED) technology, plasma display panel (PDP) technology, light-emitting polymer display (LPD) technology, active-matrix OLED (AMOLED) technology or electrophoretic ink technology may be used in other embodiments. The display 38 may also include a backlight unit for providing backlight illumination toward the display 38.

The magnified representation 22 displayed by the display 38 may be a still image or a video stream. For example, the handheld electronic magnifier 20 may be adapted for generating the magnified representation 22 as a video stream having a frame rate of 60 frames per second, but other frame rates are possible. In some embodiments, in order for the display 38 to provide a see-through effect when displaying the magnified representation 22 of the object 24, both the resolution of the display 38 and its size relative to that of the display face 30 should preferably be maximized. As used herein, the expression "see-through" is used to indicate that the magnified representation of the object is to appear to a user as if viewed directly through the handheld electronic magnifier. In order to enhance the see-through effect provided by the display, the camera 36 may, but need not, be located in a central region of the camera face 28, as illustrated in FIG. 1.

Input Interface

Referring back to FIG. 2, the handheld electronic magnifier 20 may also provide an input interface 62 that accepts tactile input from the user. In such embodiments, the input interface 62 may include a touchscreen 64 extending on the display face 30 and overlying at least partly the display 38. Additionally or alternatively, the input interface 62 may be provided with one or more control buttons 66 for operating the handheld magnifier 20. By way of example, in FIG. 2, four control buttons 66 are arranged along the left and right edges of the display 38 to provide functions such as magnification (i.e., zoom in and zoom out), image capture and contrast enhancement. Of course, other functions may additionally or alternatively be provided in other embodiments.

Handle

Referring to FIGS. 1 to 5, the handheld electronic magnifier 20 includes a handle 32 rotatably connected to the casing 26. As used herein, the term "handle" refers to a physical component of the handheld electronic magnifier that is adjustable for use in a number of different orientations, at least one of which involves the user grasping, gripping or holding the handle.

In the illustrated embodiment, the handle 32 is formed by connecting a front and a rear portion 70, respectively defining an outer face 72 and an inner face 74 of the handle. As used herein, the term "inner face" designates the face of the handle which is facing the camera face when the handheld electronic magnifier is configured in the compact mode (see, e.g., FIGS. 1, 2 and 9), while the term "outer face" refers to the face of the handle opposed to the inner face.

In the illustrated embodiment, the front and rear portions 68, 70 together defines a cavity that houses a battery 76 (see FIG. 6) for powering the handheld electronic magnifier 20. The battery 76 may be connected to the processing unit 50 located in the casing 26 by a wired connection 77 routed through a passageway 78 (see FIG. 7B) defined in the two-axis hinge assembly 34. In other embodiments, the battery 76 may be provided in the casing 26 rather than in the handle 32.

As for the casing 26, the handle 32 may be made of a strong and durable material (e.g., molded plastic or lightweight metals such as aluminum and magnesium alloys) capable of providing an effective, reliable and comfortable user interaction and of sustaining repeated use. In some embodiments, the handle 32 may be ergonomically designed for facilitating grasping, gripping or holding by a hand or fingers of a user, for example by being provided with rounded corners. In some embodiments, the handle 32 may include tabs or other features on its surface to provide cues to the user about how the handle 32 can be rotated and/or to facilitate manipulations.

In the illustrated embodiment, the handle 32 is shaped generally as a rectangular prism whose three linear can be stated in terms of a length $l_h$, a width $w_h$ and a thickness $t_h$.

As used herein, the term "length" and variants thereof when referring to the handle designate a linear dimension that extends in a plane parallel to the inner or outer face, generally along the long-side direction thereof.

As used herein, the term "width" and variants thereof when referring to the handle designate a linear dimension that extends in a plane parallel to the inner or outer face, perpendicularly to the length of the handle and generally along the short-side direction thereof.

As used herein, the term "thickness" and variants thereof when referring to the handle designate a linear dimension that is perpendicular to both the inner and outer faces, and thus to both the length and the width of the handle It will be understood that, in some embodiments, the length-to-thickness ratio and the width-to-thickness ratio can each be relatively large to ensure that the handle remains sufficiently thin for facilitating grasping by a user. It is to be noted that when the casing and the handle are brought toward each other in the compact mode (see, e.g., FIGS. 1, 2 and 9), the length $l_c$, width $w_c$ and thickness $t_c$ of the casing 26 become parallel to the length $l_h$, width $w_h$ and thickness $t_h$ of the handle 32, respectively.

The length $l_h$, width $w_h$ and thickness $t_h$ of the handle 32 may each be selected depending on the application. For example, in FIG. 4, $l_h$=131 mm, $w_h$=39 mm and $t_h$=14 mm. Of course, these dimensions are provided by way of example only and may differ in other embodiments. It will also be understood that, while in some embodiments the handle need not be shaped as a rectangular prism, it may still be described in terms of a length, a width and a thickness.

Two-Axis Hinge Assembly

Figure 7A:
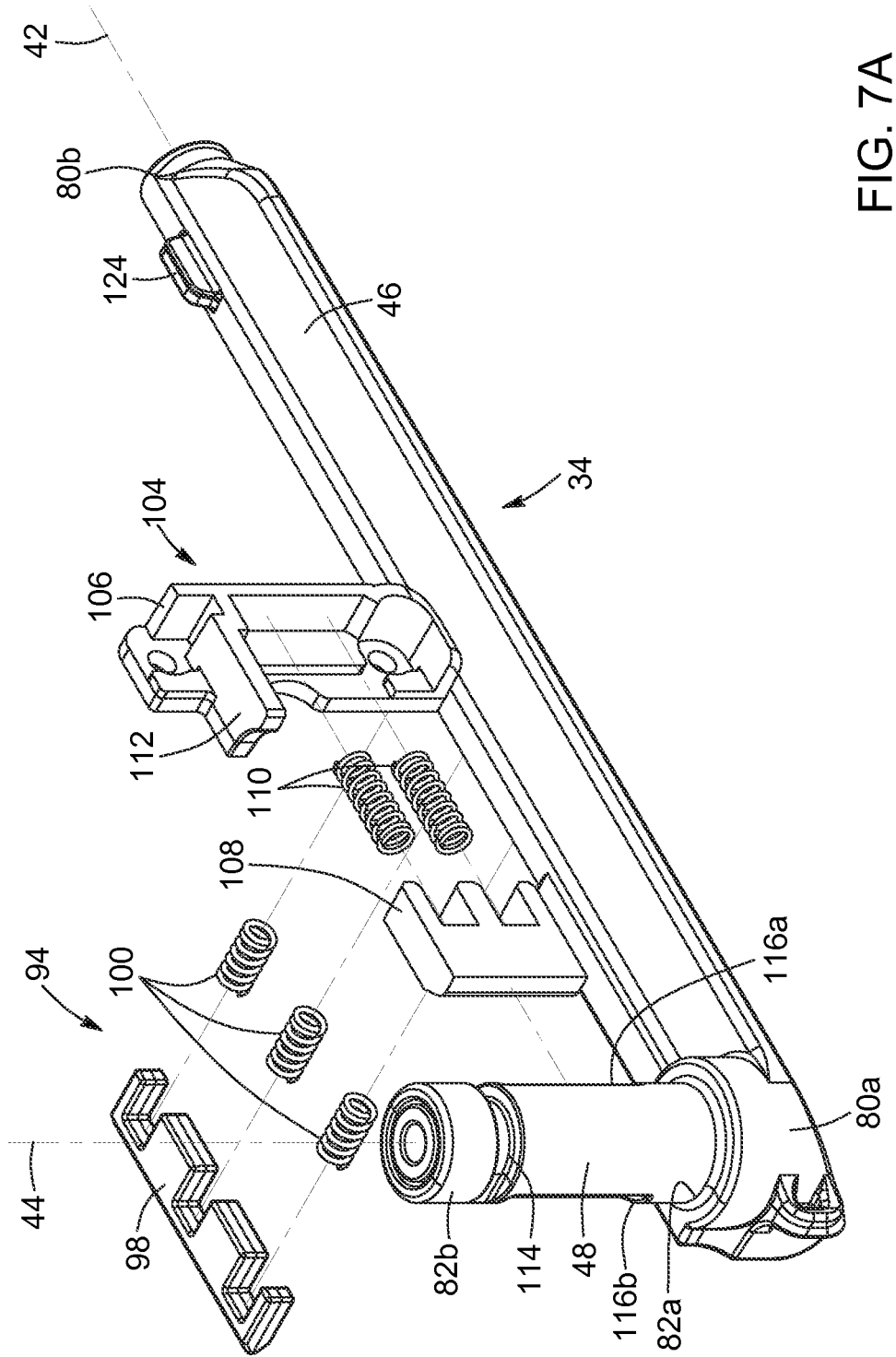
FIGS. 7A and 7B are perspective views of the two-axis hinge assembly and the first and second detent mechanisms of the handheld electronic magnifier of FIG. 1.
Figure 7B:
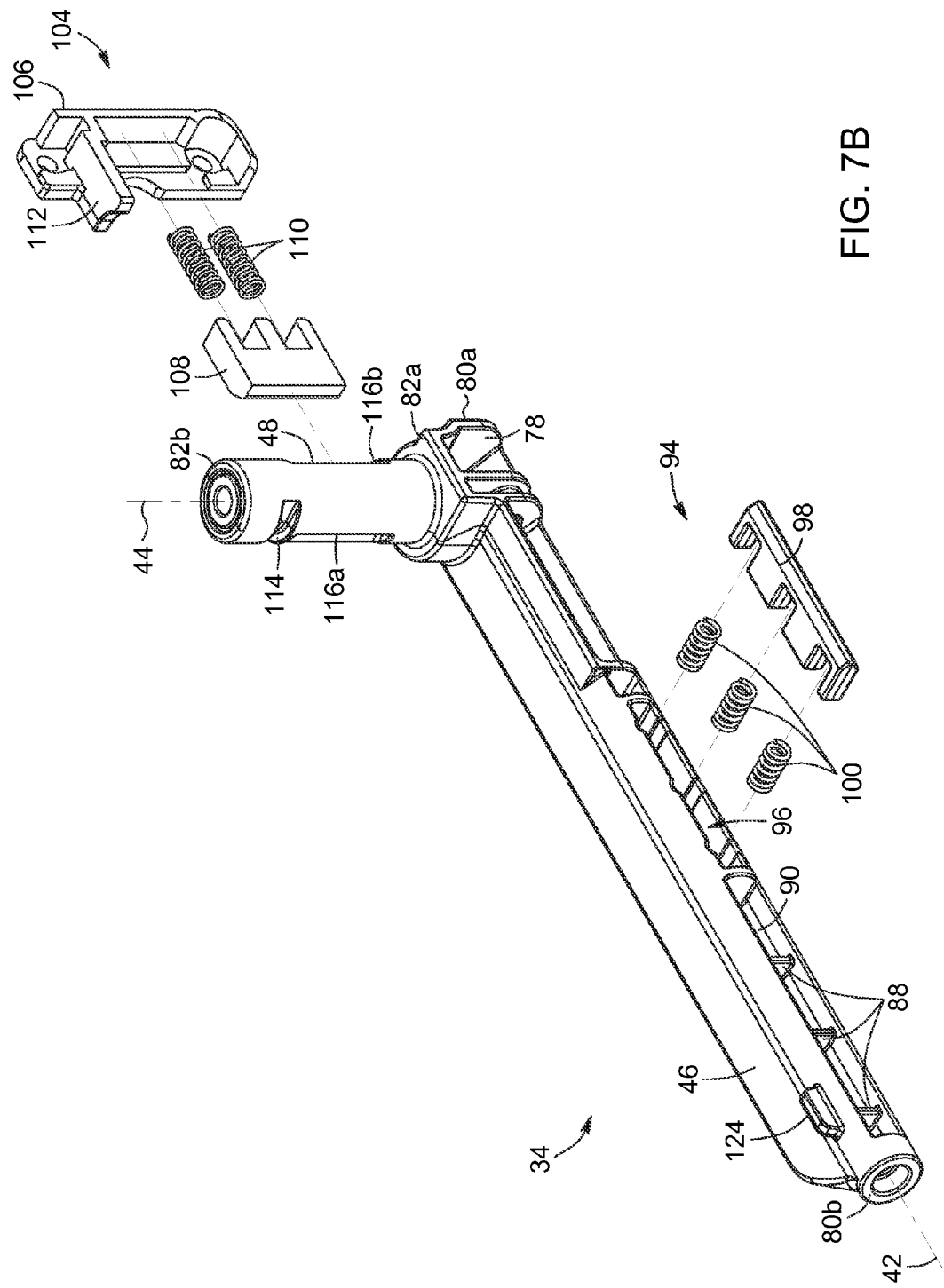

Referring now to FIGS. 1 to 5, in conjunction with FIGS. 7A and 7B, the handheld electronic magnifier 20 further includes a two-axis hinge assembly 34 that rotatably connects the casing 26 and the handle 32 to enable relative rotational movement therebetween about a first hinge axis 42 and a second hinge axis 44. The first and second hinge axis 42, 44 are perpendicular to each other and extend respectively along the length $l_c$ of the casing 26 and the width $w_h$ of the handle 32.

As used herein, the term "hinge assembly" refers to any coupling assembly that connects the casing and the handle of the handheld electronic magnifier in a manner that allows the casing and the handle to move in a rotating or pivoting manner relative to each other. The term "two-axis" when referring to the hinge assembly means that the casing and the handle can be rotated or pivoted relative to each other independently about two distinct axes, preferably two orthogonal axes.

It will be understood that the terms "hinge", "hinged", "hingedly" and any variants thereof should be interpreted broadly to describe and encompass any manner of coupling or connection between the casing and the handle which allows the handle to rotate relative to the casing without disengagement therefrom. Those skilled in the art will recognize that actual hinges may, but need not, be provided to connect the handle to the casing. It is to be noted that, for simplicity, the expression "two-axis hinge assembly" may, in some instances, be shortened to "hinge assembly".

The two-axis hinge assembly 34 includes a longitudinal hinge member 46 and a transverse hinge member 48, each having a proximal end 80a, 82a and a distal end 80b, 82b. The longitudinal and transverse hinge members 46, 48 extend along the first and second hinge axes 42, 44, respectively, and are rigidly fixed to, or integrally formed with, each other. As used herein, the term "rigidly fixed" means that no relative movement of the rigidly fixed elements is permitted under normal operating conditions and, in particular, that the rigidly fixed elements are non-rotatably connected.

The longitudinal and transverse members 46, 48 may be made of a lightweight metal alloy (e.g., an aluminum or magnesium alloy), durable plastic (e.g., nylon) or another strong and durable material capable of sustaining repeated rotations of the handle 32 relative to the casing 26. In the illustrated embodiment, the longitudinal and transverse hinge members 46, 48 extend from each other at their respective proximal ends 80b, 82b such that the two-axis hinge assembly 34 has a substantially L-shaped arrangement with a first arm defined by the longitudinal hinge member and a second arm defined by the transverse hinge member, although other arrangements may be envisioned. As mentioned above, it is to be noted that while the longitudinal and transverse hinge members 46, 48 are referred to as connected elements, they may, in some embodiments, be formed integrally with each other so that the two-axis hinge assembly 34 forms an integral single-unit body.

Longitudinal Hinge Member

Referring still to FIGS. 1 to 5, 7A and 7B, the longitudinal hinge member 46 is rotatably connected to the casing 26 to enable rotation of the handle 32 about the first hinge axis 42 toward and away from the camera face 28. As used herein, the term "longitudinal" is intended to refer to the fact that the longitudinal hinge member 46 is connected to the casing 26 along the longitudinal (i.e., lengthwise) direction thereof, for example along a bottom lengthwise edge 84 of the camera face 28, as in the illustrated embodiment. It will be understood that since the longitudinal hinge member 46 is connected to the transverse hinge member 48, which itself is connected to the handle 32, the handle 32 is also rotated about the first hinge axis 42 toward and away from the camera face upon rotation of the longitudinal hinge member 46.

In the illustrated embodiment, the longitudinal hinge member 46 is shaped generally as an elongated hollow body, connected to the casing 26 by mechanical connections of the pin-and-slot type (not shown) provided along the first hinge axis 42 near the proximal end 80a and the distal end 80b of the longitudinal hinge member 46. Other types of connections may be used in other embodiments to provide the rotational coupling between the longitudinal hinge member 46 and the casing 26. Optionally, a plurality of axially spaced reinforcing ribs 88 may be formed on the inner wall 90 of the longitudinal hinge member 46 to provide added strength thereto.

Figure 3:
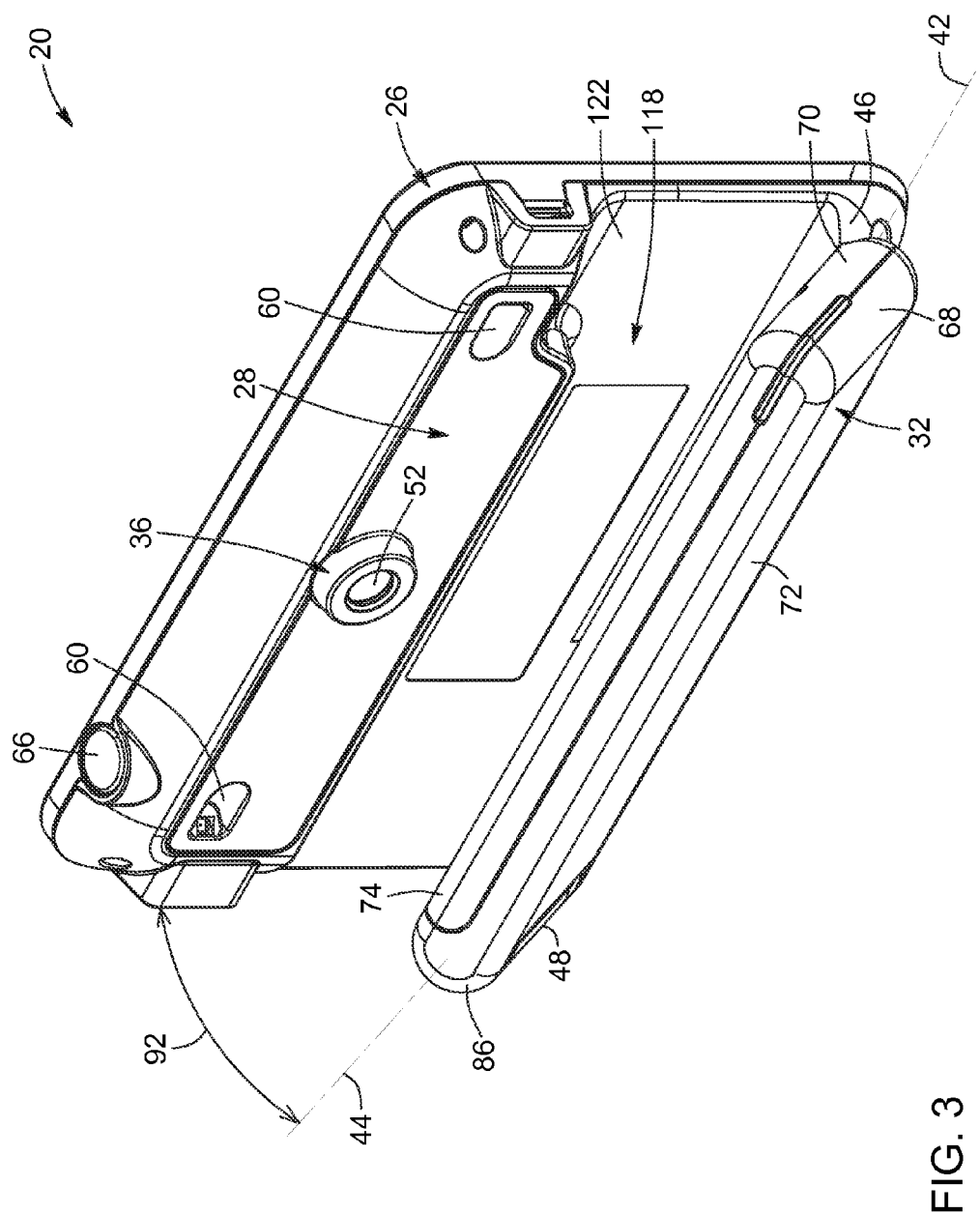
FIG. 3 is a perspective view of the handheld electronic magnifier of FIG. 1, wherein the handle is in the open position and in the retracted state.

Referring to FIGS. 1 and 3, in the illustrated embodiment, the handle 32 is rotatable about the first hinge axis 42 between a closed position (FIG. 1) and an open position (FIG. 3). In the closed position, the two-axis hinge assembly 34 lies in a plane substantially parallel to the camera face 28, while in the open position, the two-axis hinge assembly 34 lies in a plane that is inclined at an inclination angle 92 relative to the camera face 28. In some embodiments, the inclination angle 92 may range from 10 to 90 degrees. By way of example, in the embodiment of FIG. 3, the inclination angle 92 of the hinge assembly 34 relative to the camera face 28 is equal to about 38 degrees. Of course, in other embodiments, the inclination angle may be less than 10 degrees or more than 90 degrees.

Figure 4:
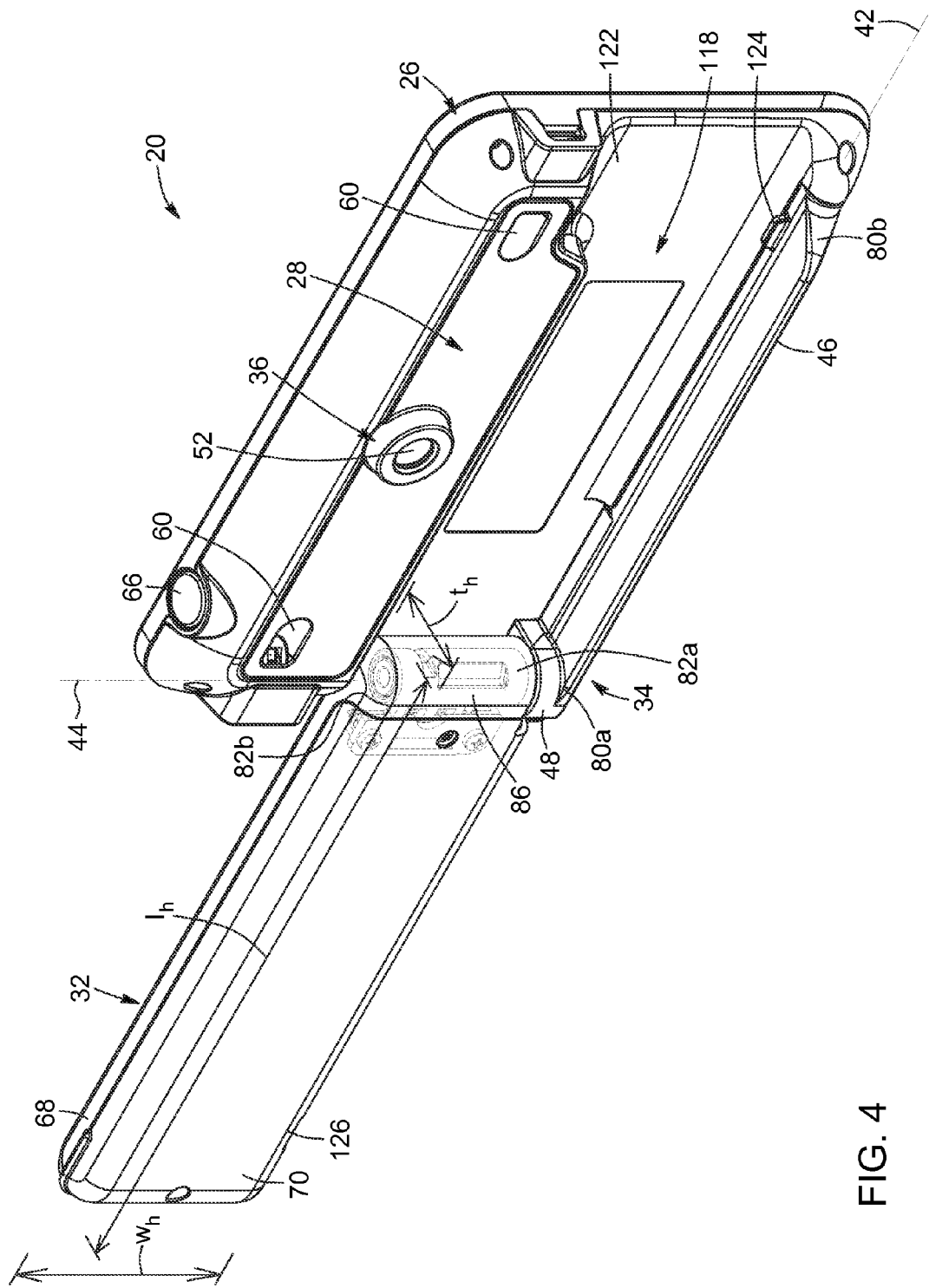
FIG. 4 is a perspective view of the handheld electronic magnifier of FIG. 1, wherein the handle is in the closed position and in the deployed stare.
Figure 5:
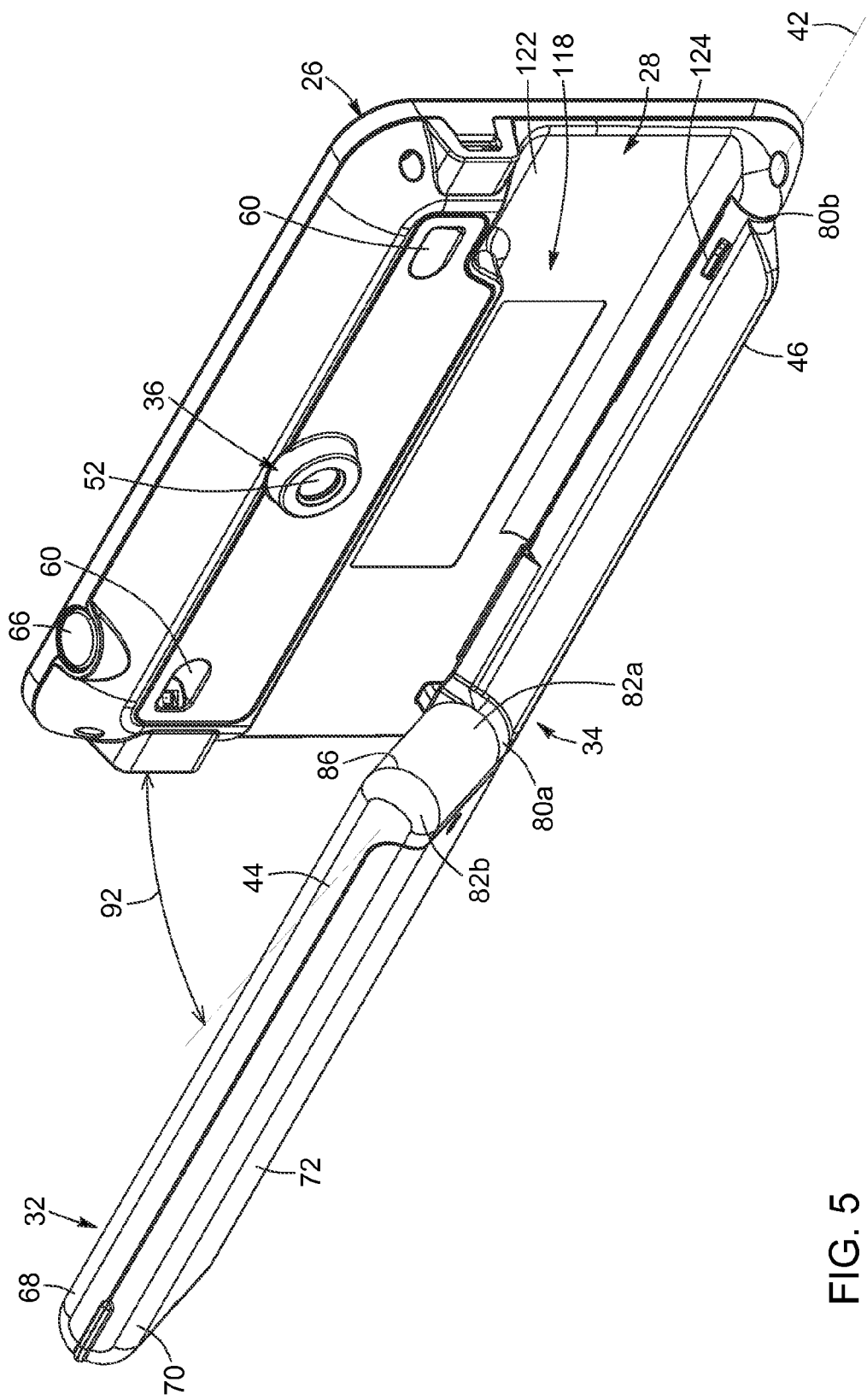
FIG. 5 is a perspective view of the handheld electronic magnifier of FIG. 1, wherein the handle is in the open position and in the deployed state.

It is to be noted that the closed position and the open position are defined independently of the state (e.g., retracted or deployed) of the handle 32 relative to the transverse hinge member 48. By way of example, this means that each of FIGS. 1, 2 and 4 depicts the handle 32 in the closed position and that each FIGS. 3 and 5 depicts the handle 32 in the open position. In some embodiments, the handle 32 may also be brought into one or more discrete intermediate angular positions between the closed and open positions. In yet other embodiments, the handle 32 may be rotated through a continuous range of intermediate angular positions between the closed and open positions.

Referring to FIGS. 7A, 7B and 8A to 8C, the two-axis hinge assembly 34 can include a first detent mechanism 94 operatively connected between the longitudinal hinge member 46 and the casing 26 for releasably locking the longitudinal hinge member 46, and thus the handle, into one of a plurality of discrete first angular positions relative to the casing 26, namely two angular positions in the illustrated embodiment. Those skilled in the art will recognize that various types of detent mechanism may be used to provide a lockable rotation mechanism (e.g., a manual keylock detent) allowing for the longitudinal hinge member 46 to be selectively rotated relative to the casing 26 about the first hinge axis 42 and releasably retained into a plurality of discrete angular positions (e.g., two positions) over a certain arc (e.g., 38 degrees).

By way of example, the first detent mechanism 94 may be a spring-loaded detent mechanism including a spring-loaded detent 98 and one or more detent springs 100 (e.g., three detent springs 100 in the illustrated embodiment; see FIGS. 7A and 7B). In this embodiment, a cavity 96 is formed in the longitudinal hinge member 46 for holding the spring-loaded detent 98 and the detent springs 100, the detent springs 100 being, at one end, rigidly fixed to the spring-loaded detent 98 and, at the other end, held in place at the bottom of the cavity 96. First and second recesses 102a, 102b (e.g., V-shaped recesses) are formed one above the other in the bottom lengthwise edge 84 of the camera face 28, into which the spring-loaded detent 98 may be releasably engaged.

Figure 8A:
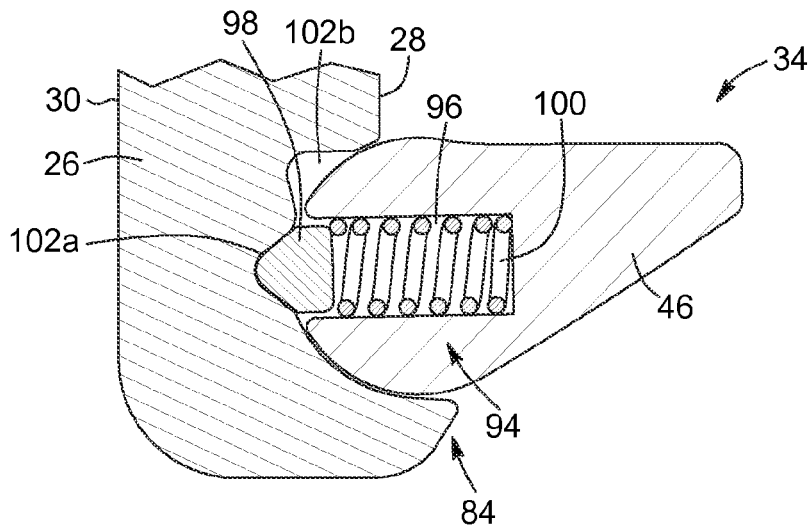
FIGS. 8A to 8C are schematic cross-sectional representations of the handheld electronic magnifier of FIG. 1, illustrating the operation of the first detent mechanism to bring the handle from the closed to the open position thereof.
Figure 8B:
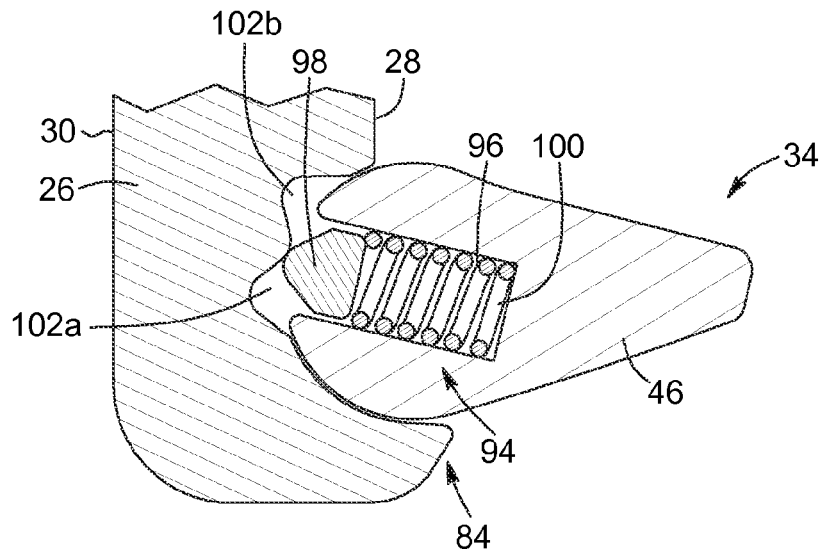
Figure 8C:
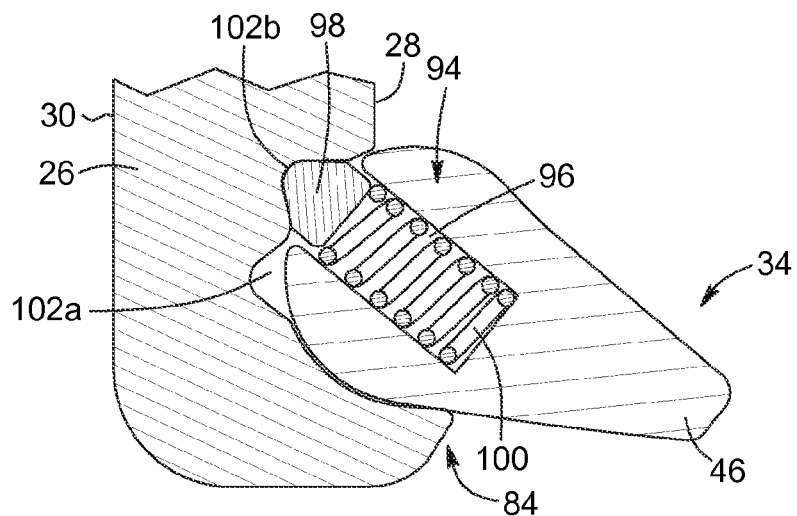

In FIG. 8A, when the handle (and thus the longitudinal hinge member 46) is in the closed position, the detent springs 100 push against the spring-loaded detent 98 sufficiently for the spring-loaded detent 98 to become securely engaged in the first recess 102a. Likewise, when the handle (and thus the longitudinal hinge member 46) is in the open position, the detent springs 100 push against the spring-loaded detent 98 sufficiently for the spring-loaded detent 98 to become securely engaged in the second recess 102b, as illustrated in FIG. 8O. Upon rotation of the handle (and thus of the longitudinal hinge member 46), for example from the closed to the open position, the receiving surface of the first recess 102a gradually pushes against the spring-loaded detent 98 to further compress the detent springs 100, until the spring-loaded detent 98 is released from the first recess 102a, as illustrated in FIG. 8B. As the rotation of the handle continues, the spring-loaded detent 98 is urged into the second recess 102b by the detent springs 100 and the handle (and thus the longitudinal hinge member 46) is brought in the open position.

It will be understood that in embodiments where one or more discrete intermediate angular positions are provided between the closed and open positions, one or more corresponding additional recesses may be formed in the longitudinal hinge member between the first and second recesses. Those skilled in the art will recognize that various types of detent mechanism may be used to provide such discrete intermediate angular positions (e.g., friction hinges).

Transverse Hinge Member

Referring to FIGS. 1 to 5, 7A and 7B, the transverse hinge member 48 is rotatably connected to the handle 32 to enable rotation of the handle 32 about the second hinge axis 44. As used herein, the term "transverse" is intended to refer to the fact that the transverse hinge member 48 is connected to the handle 32 along the transverse (i.e., widthwise) direction thereof, for example along a widthwise edge 86 of the handle 32, as in the illustrated embodiment. It will be understood that since the transverse hinge member 48 is connected to the longitudinal hinge member 46, which itself is connected to the casing 26, the handle 32 is also rotated relative to the casing 26 upon being rotated the second hinge axis 44.

Referring more specifically to FIGS. 1 and 4, in the illustrated embodiment, the handle 32 is rotatable about the second hinge axis 44 between a retracted state (FIG. 1), where the handle 32 is side-by-side adjacent and lengthwise parallel to the longitudinal hinge member 46, and a deployed state (FIG. 4), where the handle 32 is flipped away from the longitudinal hinge member 46. In the illustrated embodiment, the retracted and deployed states are separated from each other by an angle of about 180 degrees, but other values of angular separation may be used in other embodiments.

It is to be noted that the retracted and deployed states associated with the transverse hinge member 48 are defined independently of the position (e.g., open or closed) of the longitudinal hinge member 46 relative to the casing 26. By way of example, this means that each of FIGS. 1 to 3 depicts the handle 32 in the retracted state and that both FIGS. 4 and 5 depict the handle 32 in the deployed state. In some embodiments, the transverse hinge member 48 may also be brought into one or more discrete intermediate angular states between the retracted and deployed states. In other embodiments, the longitudinal hinge member 46 may be rotated through a continuous range of intermediate angular states between the retracted and deployed states.

The two-axis hinge assembly 34 can include a second detent mechanism 104 operatively connected between the transverse hinge member 48 and the handle 32 for releasably locking the handle 32 into one of a plurality of discrete second angular states relative to the transverse hinge member 48, namely two angular positions in the illustrated embodiment. Those skilled in the art will recognize that various types of detent mechanism may be used to provide a lockable rotation mechanism allowing for the handle 32 to be selectively rotated relative to the transverse hinge member 48 about the second hinge axis 44 and releasably retained at a plurality of discrete angular states (e.g., two states) over a certain arc (e.g., 180 degrees).

Referring to FIGS. 7A and 7B, the second detent mechanism 104 may be a spring-loaded detent mechanism whose structure and operation is similar to the first detent mechanism 94 described above in connection with the longitudinal hinge member 46. The second detent mechanism 104 may include a base member 106, a spring-loaded detent 108 and one or more detent springs 110 (e.g., two detent springs 110 in the illustrated embodiment). The base member 106 is fixedly connected to the handle 32 (see FIG. 4, depicting the second detent mechanism 104 in phantom lines) and may have a guide pin 112 projecting therefrom and slidably or frictionally engaged inside an annular groove 114 defined in the transverse hinge member 48 proximate the distal end 82b thereof. Accordingly, as the handle 32 rotates about the second hinge axis 44 between the retracted and deployed states, the guide pin 112 slidably travels along the annular groove 114. The detent springs 110 are retained in a compressed configuration between the base member 106 and the spring-loaded detent 108.

First and second recesses 116a, 116b (e.g., V-shaped recesses) may also be formed in the lateral edge of the transverse hinge member 48. In the illustrated embodiment, the first and second recesses 116a, 116b are separated by an angle of 180 degrees to reflect the angular separation between the retracted and deployed stares. The spring-loaded detent 108 of the second detent mechanism 104 are releasably engaged in the first and second recesses 116a, 116b when the handle is brought in the retracted and deployed states, respectively.

More specifically, referring to FIG. 7A, when the handle is in the retracted state, the detent springs 110 push against the spring-loaded detent 108 sufficiently for the spring-loaded detent 108 to become securely engaged in the first recess 116a. Meanwhile, when the handle is in the deployed position, the detent springs 110 push against the spring-loaded detent 108 sufficiently for the spring-loaded detent 108 to become securely engaged in the second recess 116b, as illustrated in FIG. 7B. Upon rotation of the handle, for example from the retracted to the deployed state, the receiving surface of the first recess 116a gradually pushes the spring-loaded detent 108 toward the second hinge axis 44 to compress the detent springs 110, until the spring-loaded detent 108 is released from the first recess 116a. As the rotation of the handle continues, the spring-loaded detent 108 is urged into the second recess 116b by the detent springs 110 and the handle is brought in the deployed position.

It will be understood that one or more additional recesses could be provided between the first and second recesses 116a, 116b in embodiments where one or more intermediate angular positions for the handle 32 are provided between the retracted and deployed states. It will also be understood that other arrangements are possible for the second detent mechanism 104, for example including additional pairs spring-loaded detents and recesses, one pair for each angular position of the handle relative to the transverse hinge member 48 about the second hinge axis 44.

Use Modes

By changing the relative orientation between the casing 26 and the handle 32 about the first and/or second hinge axes 42, 44, the user can operate the handheld electronic magnifier 20 according to different configurations to provide optimal viewing conditions. Three exemplary use modes will be described below with reference to FIGS. 9, 10A to 10F and to 11A to 11D.

Compact Mode

Figure 9:
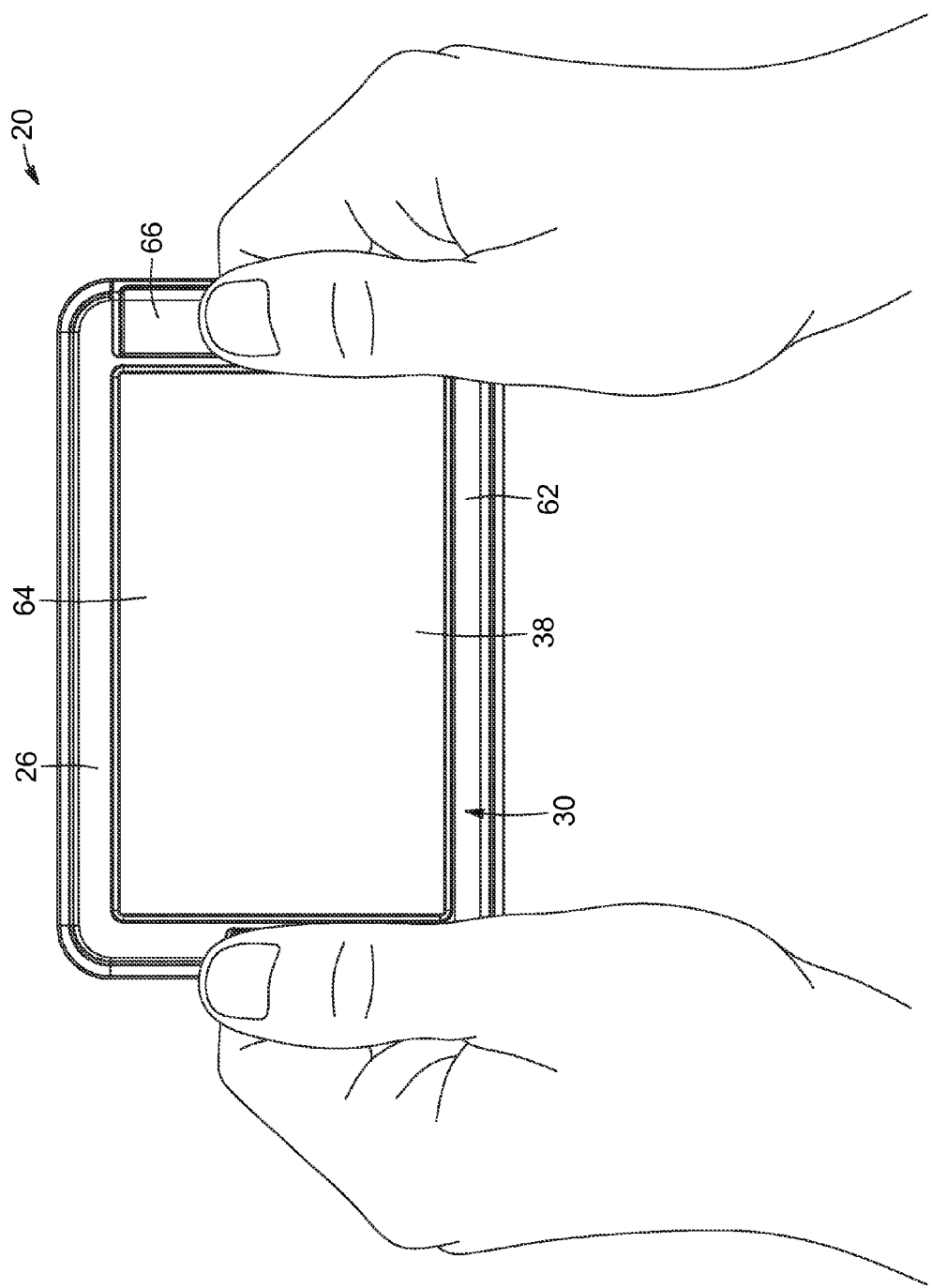
FIG. 9 is a front view of the handheld electronic magnifier of FIG. 1, in the compact mode.
Figure 10A:
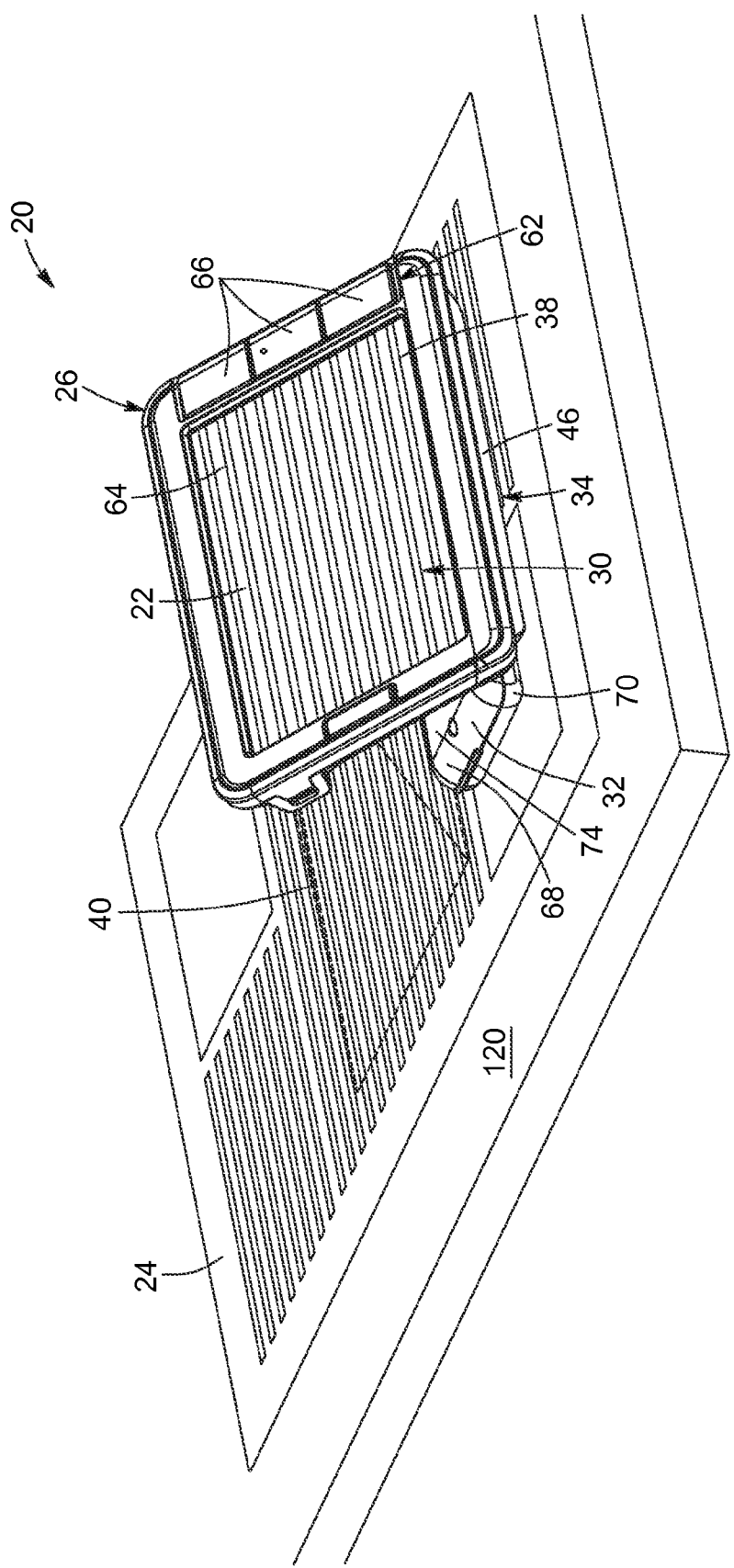
FIG. 10A is a perspective view of the handheld electronic magnifier of FIG. 1, in the desktop mode with the handle in the retracted state.
Figure 10B:
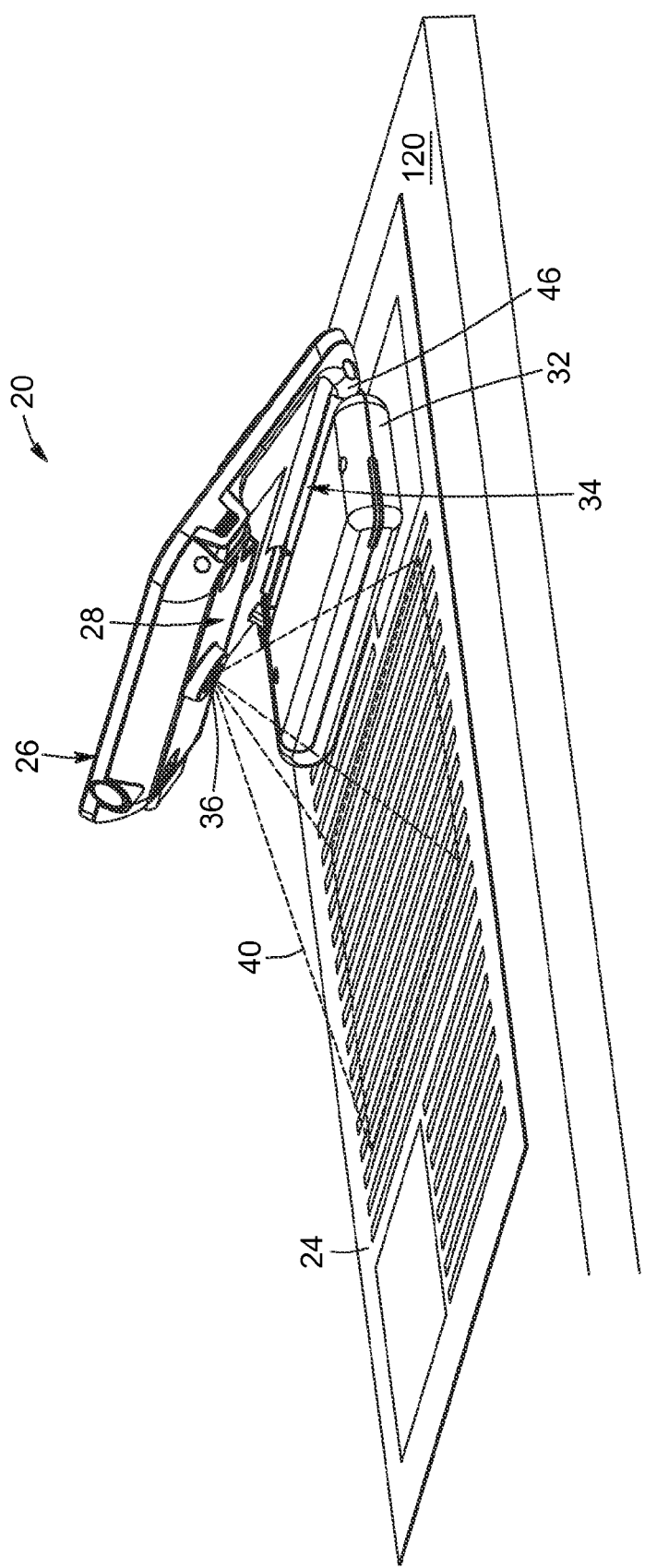
FIG. 10B is another perspective view of the handheld electronic magnifier of FIG. 10A.
Figure 10C:
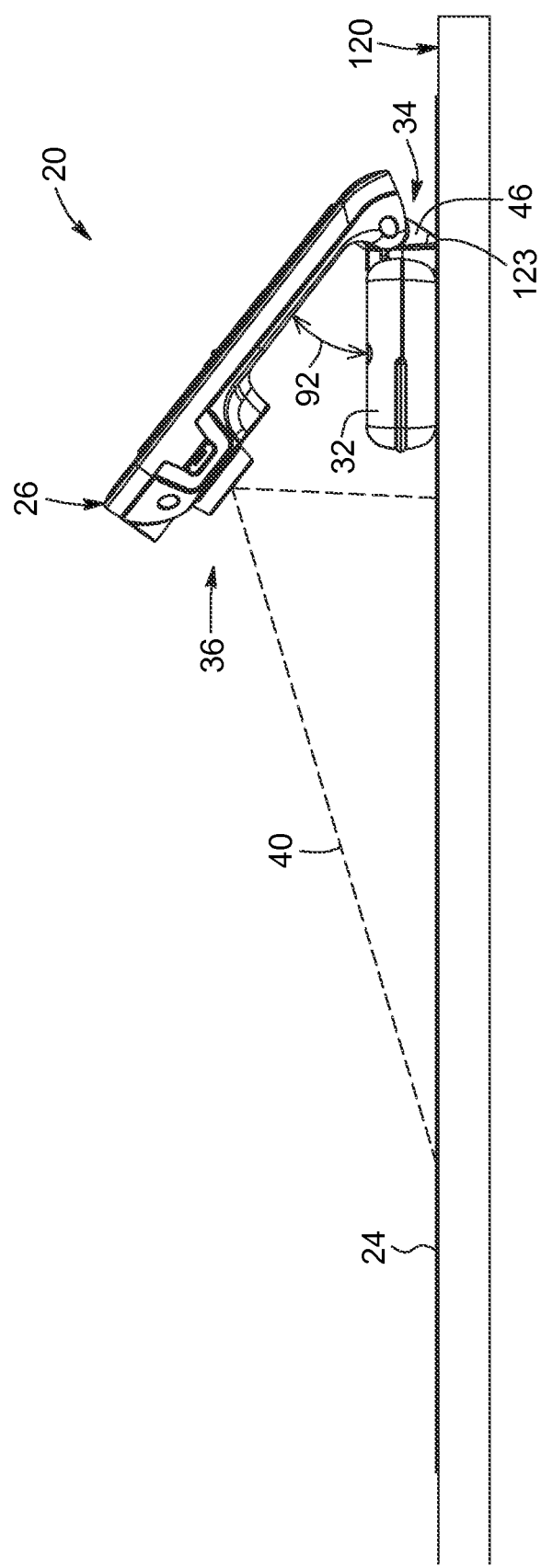
FIG. 10C is a side view of FIG. 10A.
Figure 10D:
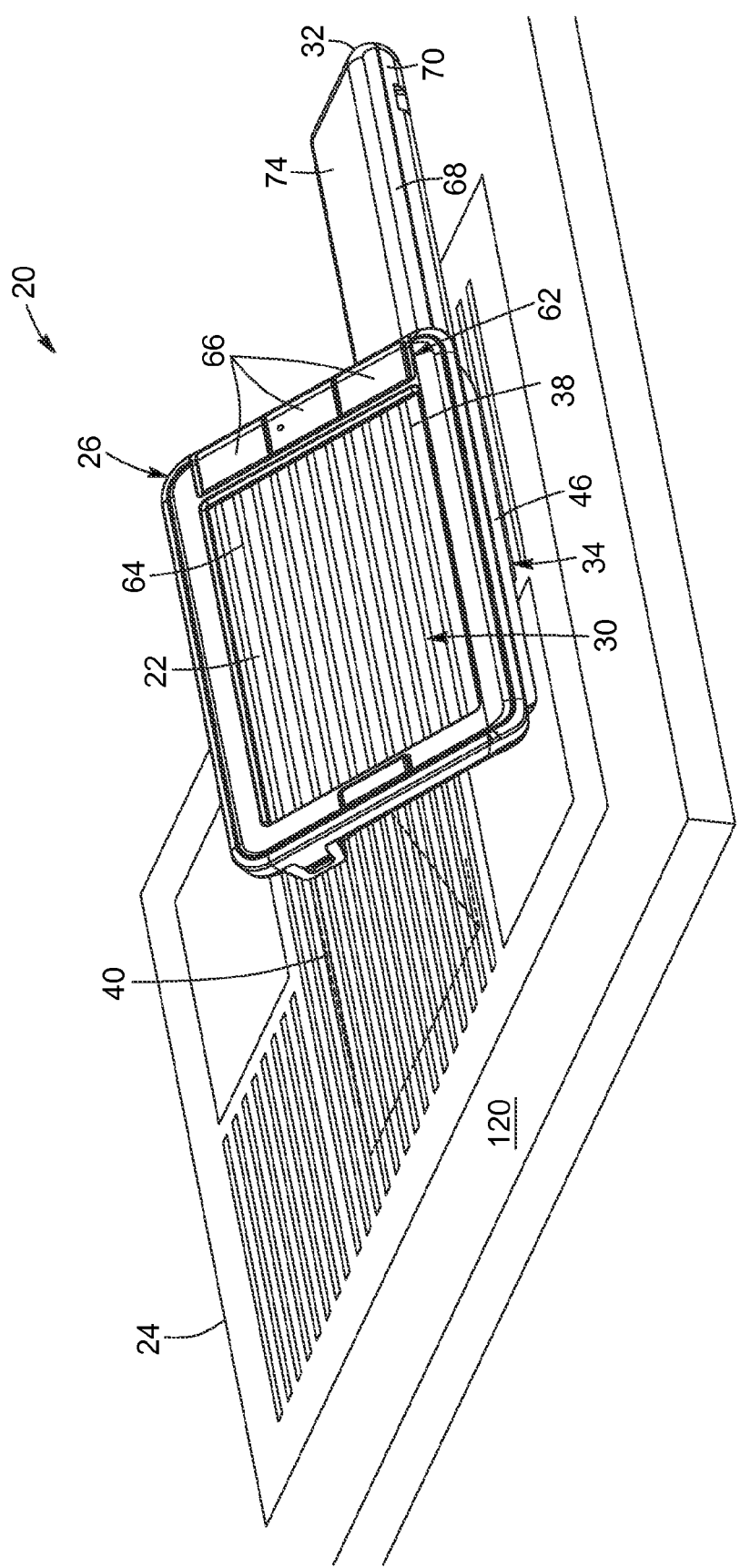
FIG. 10D is a perspective view of the handheld electronic magnifier of FIG. 1, in the desktop mode with the handle in the deployed state.
Figure 10E:
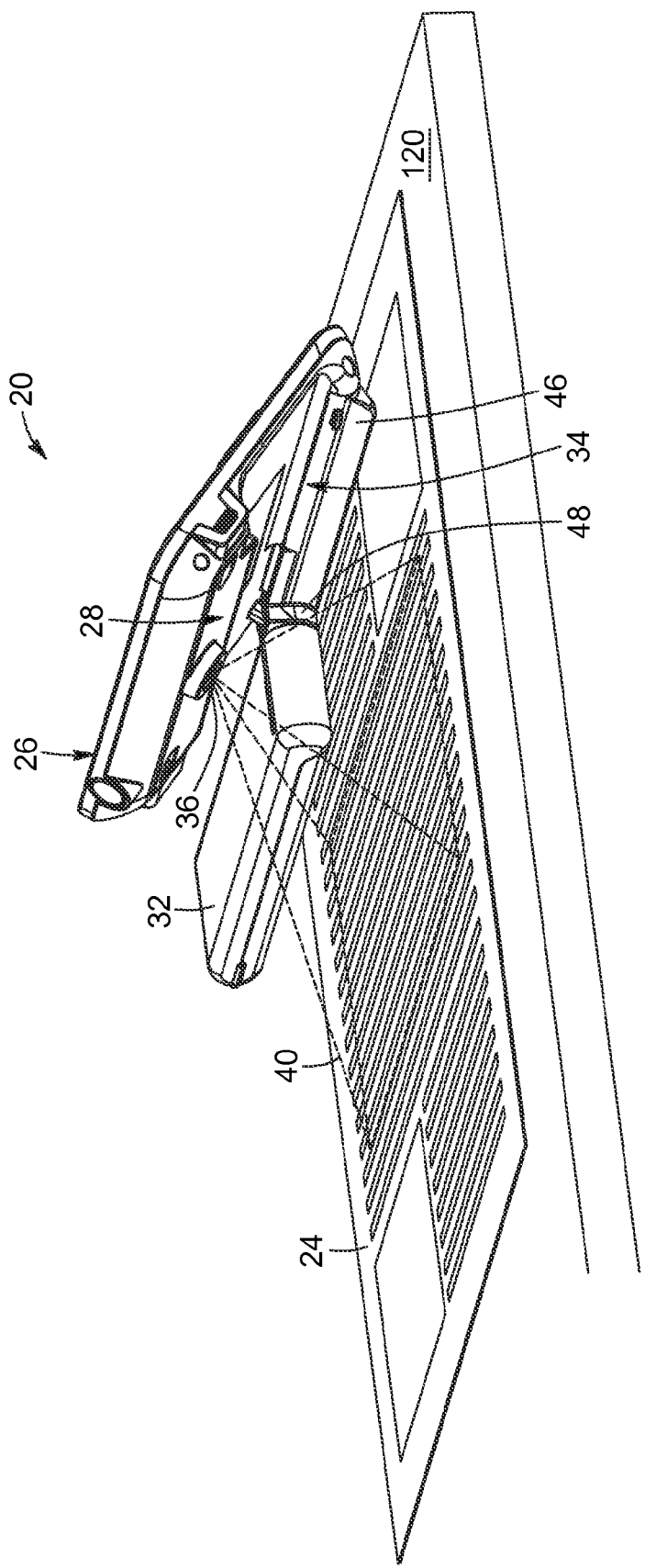
FIG. 10E is another perspective view of the handheld electronic magnifier of FIG. 10D.
Figure 10F:
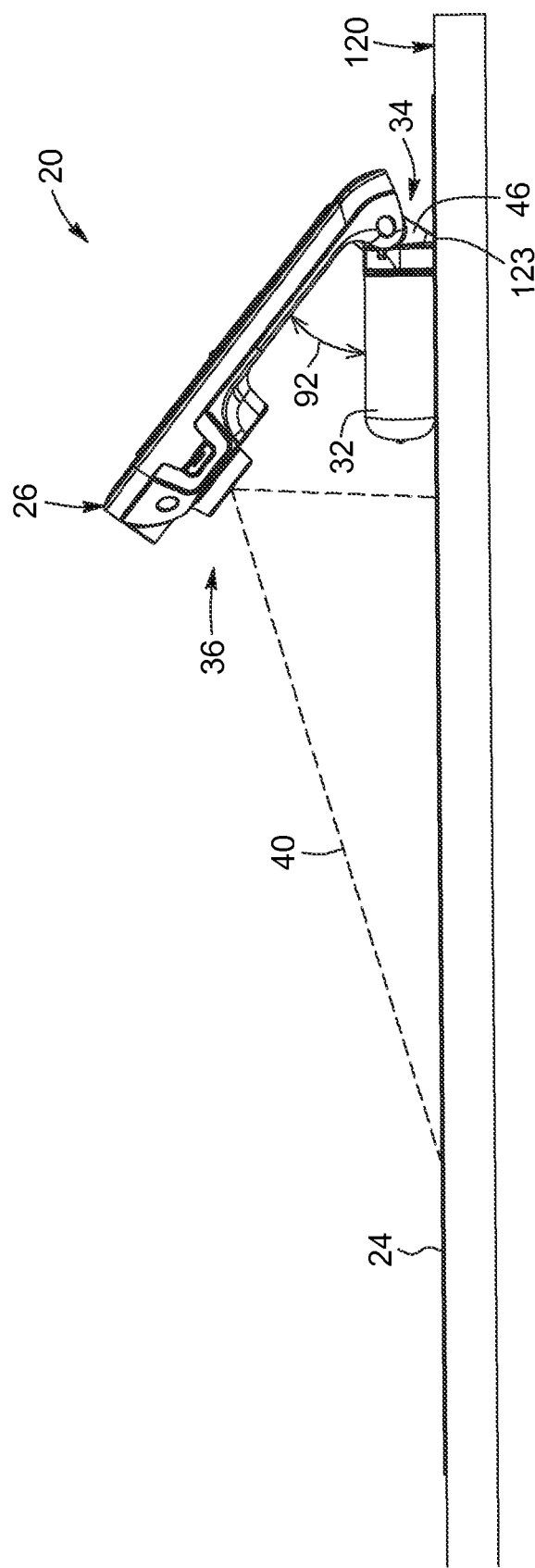
FIG. 10F is a side view of FIG. 10D.
Figure 11A:
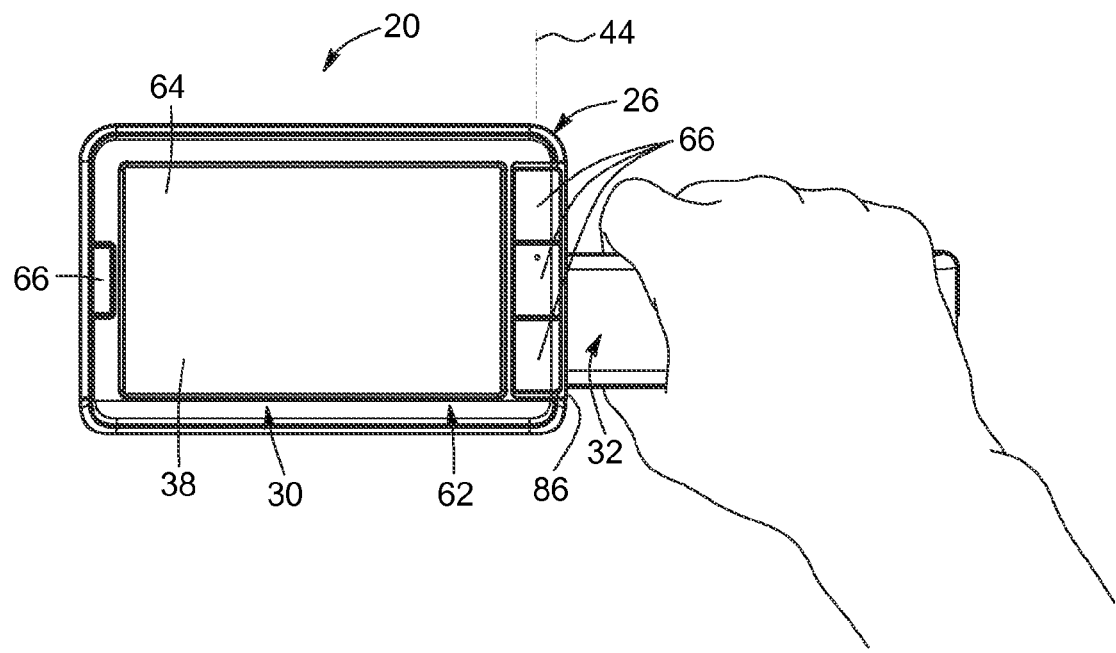
FIG. 11A is a front view of the handheld electronic magnifier of FIG. 1, in the grasping mode with the handle in the closed position.
Figure 11B:
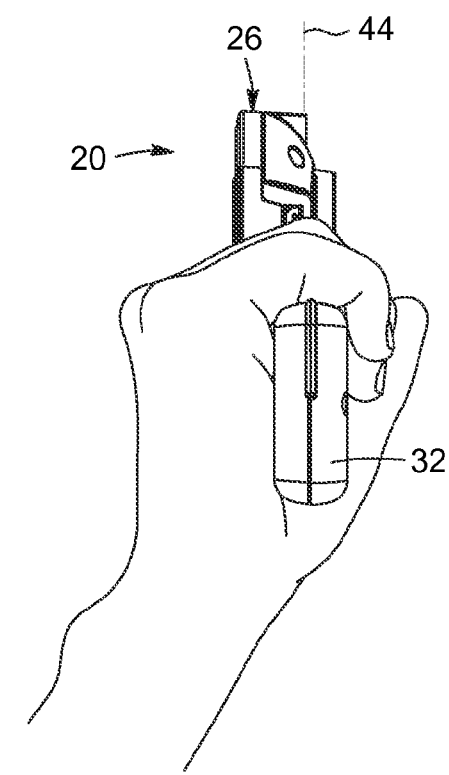
FIG. 11B is a side view of FIG. 11A.
Figure 11C:
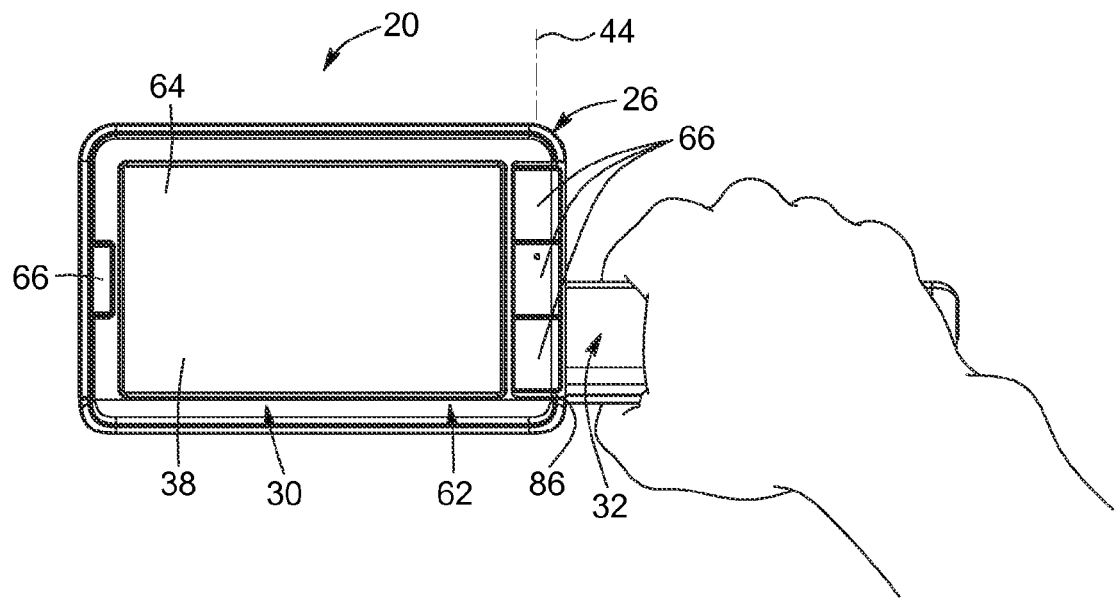
FIG. 11C is a front view of the handheld electronic magnifier of FIG. 1, in the grasping mode with the handle in the open position.
Figure 11D:
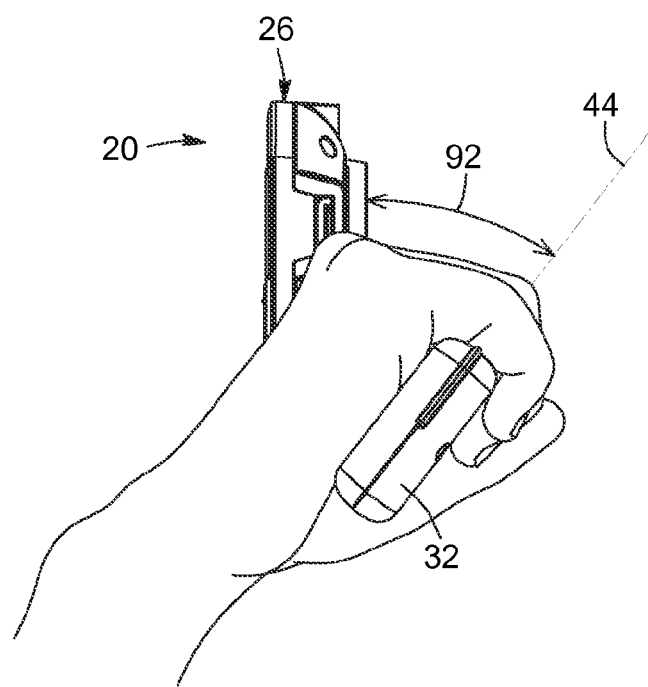
FIG. 11D is a side view of FIG. 110.

The compact mode of the handheld magnifier 20 is illustrated in FIGS. 1, 2 and 9. In this mode, the handle 32 is in the closed position and in the retracted state. As a result, the casing 26 and the handle 32 are folded inwardly toward each other in a facing relationship to reduce or minimize the space occupied by the handheld magnifier 20. In particular, in the compact mode the handheld magnifier 20 can be conveniently carried in a purse or shirt pocket, for example, and be ready for use quickly, without having to unfold the handle 32 away from the casing 26.

In the compact mode, the handheld magnifier 20 may be held and carried by the user by grasping the casing 26 between the fingers and the thumb. The user can operate the handheld magnifier 20 by pointing the camera face 28 toward an object 24 of interest and by looking at the display 38 to see a magnified representation 22 of the object 24 (see FIG. 2). The user can use the fingers of one or both hands to input commands or data to the handheld magnifier 20 via the input interface 62, for example by providing tactile input to the touchscreen 64 and/or by activating one or more of the control buttons 66.

In the compact mode, the handheld electronic magnifier 20 can provide a standalone handheld device that can be used on the go to magnify any object encountered by the user during his or her daily activities such as, for example, product labels and price tags at the grocery or other store, bills, restaurant menus, signs, posters, and the like.

Referring back to FIG. 3, in some embodiments, the camera face 28 may include a recessed portion 118 defining a cavity configured to receive the handle 32 in the compact mode. The recessed portion 118 allows for the overall thickness of the handheld magnifier 20 to be reduced when the handle 32 is folded toward the camera face 28. Moreover, in some embodiments, the width $w_h$ of the handle 32 may be sufficiently less than the width $w_c$ of the casing 26 to ensure that the handle 32 does not extend in front of the camera aperture 52 of the camera 36, as illustrated in FIG. 1. Hence, in some embodiments, when the handle 32 is in the closed position and in the retracted state, the camera aperture 52 is located above the handle 32 such that the field of view of the camera 36 is unobstructed by the handle 32.

Desktop Mode

Turning now to FIGS. 10A to 10F, the handheld electronic magnifier 20 may also be used in a desktop mode, where the handle 32 in the open position and in either the retracted state (see FIGS. 10A to 10C) or the deployed state (see FIGS. 100 to 10F), such that the handle 32 is oriented at an inclination angle 92 with respect to the casing 26. The inclination angle 92 is equal to about 38 degrees in the illustrated embodiment, but other values can be used in other embodiments, as mentioned above. In some implementations, the value of the inclination angle 92 in the desktop mode may, for example and without limitation, be selected based on the field of view, the working range or depth of field, and the image quality of the camera 36. Of course, other or different factors can be taken into account when the inclination angle in the desktop mode.

In the desktop mode, the handle 32 is intended to be placed on a working surface 120 (e.g., a table, a desk or any other suitable working area) to act as a stand that supports the casing 26 at the inclination angle 92 above the working surface 120. In this configuration, the user is free to use his or her hands to manipulate the object 24 to be magnified and/or to input data or commands to the handheld magnifier 20. Alternatively, the user may simply rest his or her hands while viewing the magnified representation 22 of the object displayed on the display 38.

Referring to FIGS. 1 and 3, in conjunction with FIGS. 10A to 10F, the handheld magnifier 20 can be brought from the compact mode to the desktop mode by grasping and pulling the handle 32 away from the camera face 28 to produce a rotation of the handle 32 about the first hinge axis 42. Furthermore, when the handheld magnifier 20 is used in the desktop mode with the handle 32 in the deployed state (FIGS. 10D to 10F) rather than in the retracted state (FIGS. 10A to 100), the user further has to rotate the handle 32 about the second hinge axis 44 from the retracted to the deployed state, either before or after bringing the handle 32 in the open position. In some embodiments, a portion of the recessed portion 118 defined in the camera face 28 may extend slightly above the upper edge of the handle 32 to thereby define a finger-receiving area 122 into which one or more fingers of the user may be inserted to facilitate grasping and pivoting of the handle 32.

In order for the handheld magnifier 20 to be sufficiently stable on the surface 120, the handle 32 should be heavy enough to resist the torque exerted by gravity on the casing 26. To this end, as mentioned above, the battery powering the handheld magnifier 20 can be provided inside the handle 32. Also, the length $l_h$ of the handle 32 may be selected so as to be only slightly less than the length $l_c$ of the casing 26, to provide adequate support to the casing 26 in the desktop mode. The width $w_h$ of the handle 32 may also be increased, while remaining preferably conveniently graspable by the user and narrow enough to ensure that the handle 32 lies entirely outside of the field of view of the camera 36 in the retracted state, that is, both in the compact mode (closed position and retracted state; see FIGS. 1, 2 and 9, as discussed above) and the desktop mode (open position and retracted state; see FIGS. 10A to 10C).

In some embodiments, the stability of the handheld magnifier 20 in the desktop mode can also be improved by placing not only the handle 32 upon the working surface 120, but also a portion 123 of the longitudinal hinge member 46, as depicted in FIG. 10O. Furthermore, referring to FIG. 4, when the handle is in the deployed state, the longitudinal hinge member 46 may be provided with a tab 124 at the distal end 80b thereof configured for engagement into a corresponding notch 126 defined near the bottom edge of the inner face 74 of the handle 32. Engagement of the tab 124 into the notch 126 can provide a contact point between the handle 32 and the longitudinal hinge member 46, which can add strength and stabilize the handheld magnifier 20 when configured in the desktop mode with the handle 32 in the retracted state.

It will be understood that, in the desktop mode, the question of whether to have the handle 32 in the retracted or deployed state can depend on various factors. For example, while the handheld magnifier 20 may generally be more stable in the retracted state (see FIGS. 10A to 10O), it may be easier to displace, orient or grab in the deployed state, due to the handle being more readily accessible. Therefore, using the handheld magnifier 20 in the desktop mode with the handle 32 in the deployed state can facilitate manipulation of the handheld magnifier 20 by a user having limited or impaired dexterity. In other cases, the question of whether to use the handheld magnifier in the desktop with the handle in the retracted or deployed state can depend on whether the handheld magnifier was used previously in the compact mode with the handle in the retracted state or in the grasping mode with the handle in the deployed state. It is to be noted that, in some embodiments, the handheld magnifier 20 can be used in the desktop mode not only in the deployed and retracted states, but also in every intermediate state (i.e., angular position) provided therebetween (if any). Referring to FIGS. 10A to 10F, in conjunction with FIG. 6, it will be understood that in the desktop mode, the image plane of the camera 36 is generally not parallel to the working surface 120 on which the handheld magnifier 20 is placed. Furthermore, when the object 24 is placed on the working surface 120, the working surface 120 will then define the object plane of the camera 36. In such embodiments, the object plane and the image plane of the camera 36 will be at an angle with respect to each other, this angle corresponding substantially to the inclination angle 92 between the two-axis hinge assembly 34 and the camera face 28 when the handle 32 is in the open position. As known in the art, the existence of an angle between the image plane and the object plane can produce perspective distortion in the image.

Therefore, in some embodiments, the processing unit 50 of the handheld magnifier 20 may include a perspective correction module 127 (see FIG. 6). In such embodiments, the perspective correction module 127 is configured to perform a perspective correction to the image acquired by the camera 36, in order compensate, at least partly, for perspective distortion stemming from a lack of parallelism between the object plane and the image plane. As a result, the magnified representation 22 of the object 24 displayed on the display 38 can be at least partly corrected for perspective distortion. Those skilled in the art will understand that the perspective correction achieved by the perspective correction module 127 can be performed using various techniques and algorithms based on image processing.

In some embodiments, because the inclination angle 92 is generally known and held constant when the handheld magnifier is used in the desktop mode, the distance between corresponding points on the object and image planes can be determined and used as input data in the perspective correction technique used by the perspective correction module 127.

Grasping Mode

Referring now to FIGS. 4, 5 and 11A to 11D, the handheld electronic magnifier 20 may also be used in a grasping mode, where the handle 32 in the deployed state and in either the closed position (see FIGS. 11A and 11B) or the open position (see FIGS. 11C and 11D) such that the handle 32 is generally rotated outwardly away from the casing 26 in order to be held by one of the user's hands.

As in the compact mode, in the grasping mode, the handheld electronic magnifier 20 can provide a standalone handheld device that can be used on the go to magnify any object encountered by the user during his or her daily activities. Advantageously, in the grasping mode, the handheld magnifier 20 can be conveniently held using only one hand grasping the handle 32, while the other hand is allowed to rest, manipulate the object and/or input data or commands to the handheld magnifier 20. By allowing the handle 32 to be placed in either the open or the closed position, or in every intermediate position therebetween, if any, the grasping mode can be suited to the particular requirements and preferences of different users, for example, user having wrist mobility issues.

Referring to FIGS. 1 and 4, the handheld magnifier 20 can be brought from the compact mode to the grasping mode by grasping and pulling the handle 32 outwardly away from the camera face 28 to produce a rotation of the handle 32 about the second hinge axis 44. The finger-receiving area 122 described above can be used to facilitate grasping and pivoting of the handle 32. Furthermore, when the handheld magnifier 20 is used in the grasping mode with the handle 32 in the open position (FIGS. 11O and 11D) rather than in the closed position (FIGS. 11A and 11B), the user further has to rotate the handle 32 about the first hinge axis 42 from the closed to the open position, either before or after bringing the handle 32 in the deployed state.

It will be appreciated that by providing the second hinge axis 44 along the widthwise edge 86 of the handle 32, rather than, for example, along the thickness of the handle 32, can lead to a mechanically stronger connection between the handle 32 and the transverse hinge member 48, which is more stable and less susceptible to wobbling in the grasping mode, where the handle 32 is in the deployed state.

Figure 12A:
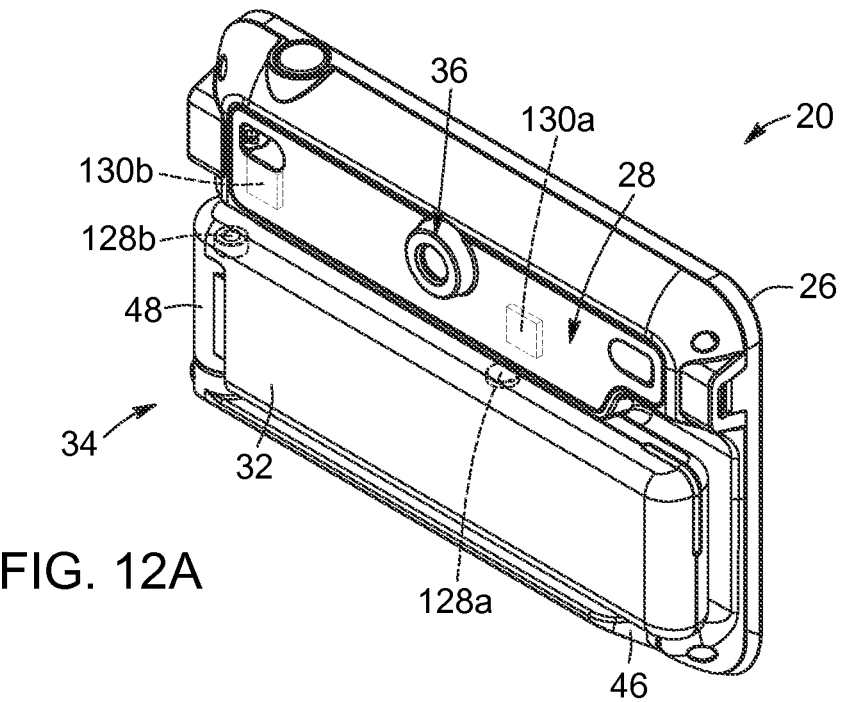
FIGS. 12A to 12D are schematic representations of the handheld electronic magnifier of FIG. 1, in the compact mode (FIG. 12A), desktop mode (FIG. 12B), grasping mode (FIG. 12C) and either the desktop mode or the grasping mode (FIG. 12D), illustrating an implementation of a magnet-based technique for determining the current mode in which the handheld electronic magnifier is configured, in accordance with an embodiment.

Referring now to FIGS. 12A to 12D, in some embodiments, it may be desirable to be able to know the mode in which the handheld magnifier 20 is operated by sensing the position of the handle 32 relative to the casing 26. This knowledge can be used, for example, to power on the handheld magnifier 20 automatically if the magnifier 20 is brought in either the desktop or grasping mode. In the embodiment of FIGS. 12A to 12O, a magnetic-based approach is implemented, in which a first magnet 128a provided in the handle 32 is associated with a corresponding first magnetic field sensor 130a provided in the casing 26, and a second magnet 128b provided in the transverse hinge member 48 is associated with a corresponding second magnetic field sensor 130b also provided in the casing 26.

In the illustrated embodiment, the first magnet 128a is located along the lengthwise edge of the handle 32 that is distal from the longitudinal hinge member 46, while the second magnet 128b is located at the distal end 82b of the transverse hinge member 48. It will be understood that these particular locations can ensure that the angular displacements of the first and second magnets 128a, 128b are sufficiently large when the use mode of the handheld magnifier 20 is changed. The magnetic field sensors 130a, 130b can be used to identify the presence or measure the strength of the magnetic field produced by the first and second magnets 128a, 128b, respectively, in order to assess the mode in which the handheld magnifier 20 is operated. In some embodiments, the magnetic field sensors 130a, 130b may be embodied by Hall effect sensors, although another type of electromagnetic proximity sensor may be used in other embodiments.

First, referring to FIG. 12A, the handheld magnifier 20 is in the compact mode, where the handle 32 is in the closed position and in the retracted state. In this configuration, the first and second magnets 128a, 128b are both close to and thus detected as being present (or strong) by the first and second magnetic field sensors 130a, 130b, respectively.

Figure 12B:
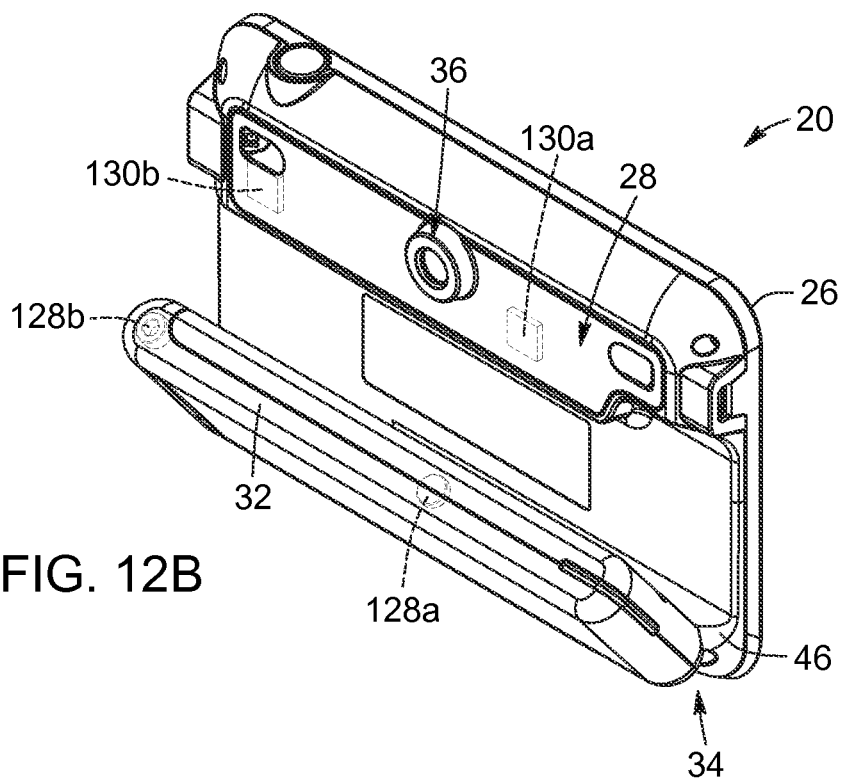
Figure 12C:
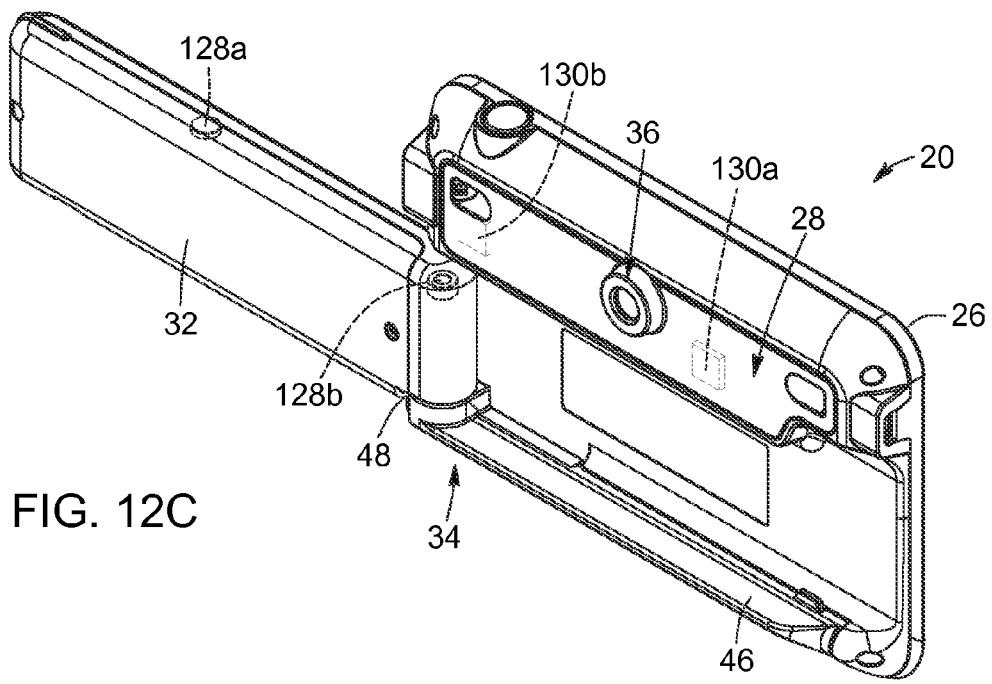

Second, referring to FIG. 12B, the handheld magnifier 20 is in the desktop mode, with the handle 32 in the retracted state and in the open position. In this configuration, the first and second magnets 128a, 128b are both located farther away from and thus detected as being absent (or weak) by the first and second magnetic field sensors 130a, 130b, respectively.

Third, in FIG. 12O, the handheld magnifier 20 is in the grasping mode, with the handle 32 in the deployed state and in the closed position. In this configuration, the first magnet 128a is located far from the first magnetic field sensor 130a, while the second magnet 128b is close to the second magnetic field sensor 130b. Accordingly, the first magnet 128a is detected as being absent (or weak) by the first magnetic field sensor 130a, while the second magnet 128b is detected as being present (or strong) by the second magnetic field sensor 130b.

Figure 12D:
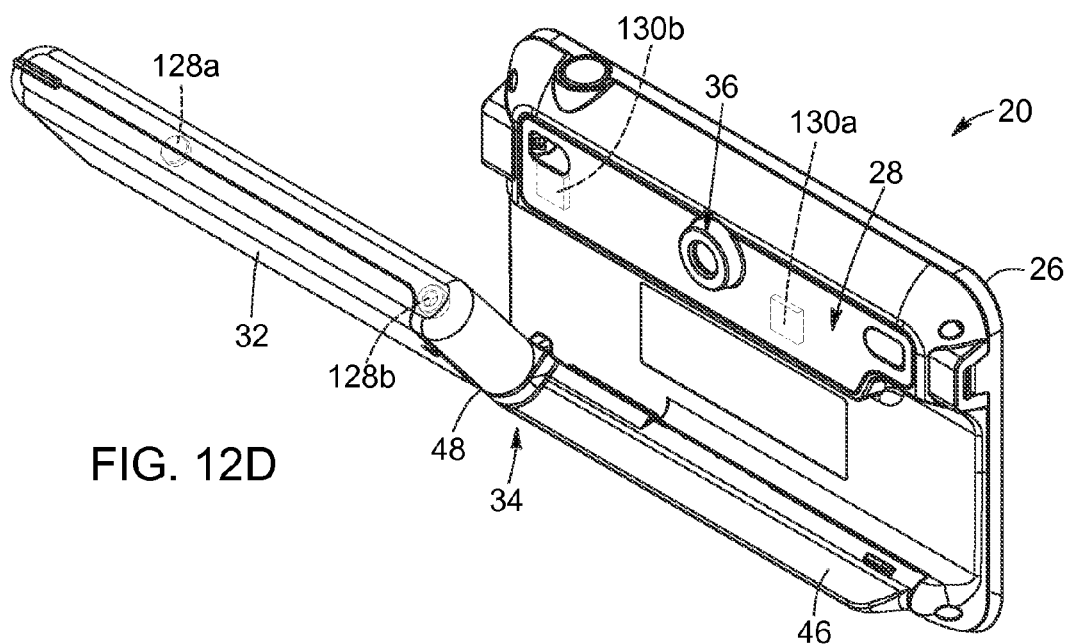

Finally, in FIG. 12D, the handheld magnifier 20 is either in the desktop or grasping mode, where the handle 32 is in the deployed state and in the open position. As in FIG. 12O, the first magnet 128a is located far from the first magnetic field sensor 130a, while the second magnet 128b is close to the second magnetic field sensor 130b. Accordingly, the first and second magnets 128a, 128b are both located farther away from and thus detected as being absent (or weak) by the first and second magnetic field sensors 130a, 130b, respectively.

It will be understood that the measurement data obtained by the magnetic field sensors 130a, 130b can be used by the processing unit to control or adjust the operation of the handheld magnifier 20. Therefore, in some embodiments and as mentioned above, the handheld magnifier 20 may be powered automatically whenever it is identified as being in the desktop or grasping mode. In particular, in the illustrated embodiment, the handheld magnifier 20 may be turned on whenever the first magnet 128a is detected as being absent or weak by the first magnetic field sensor 130a. Hence, in some embodiments, the handheld magnifier 20 may be powered on and be ready for use simply by rotating the handle 32 to bring handheld magnifier 20 in the desktop and/or grasping mode, without the user having to manually power on the handheld magnifier 20.

Of course, numerous modifications could be made to the embodiments described above without departing from the scope of the present invention.

The invention claimed is:

1. A handheld electronic magnifier for providing a magnified representation of an object, the handheld electronic magnifier comprising:
a casing having a camera face and an opposed display face;
a camera provided inside the casing and having a field of view extending from the camera face, the camera being configured to acquire an image of the object within the field of view;
a display extending along the display face and configured to display the magnified representation of the object based on the image acquired by the camera;
a handle; and
a two-axis hinge assembly rotatably connecting the casing and the handle about a first hinge axis and a second hinge axis perpendicular to each other and extending respectively along a length of the casing and a width of the handle, the two-axis hinge assembly comprising:
a longitudinal hinge member extending along the first hinge axis and rotatably connected to the casing to enable rotation of the handle about the first hinge axis toward and away from the camera face; and
a transverse hinge member extending along the second hinge axis and rigidly fixed to the longitudinal hinge member, the transverse hinge member being rotatably connected to the handle to enable rotation of the handle about the second hinge axis.

2. The handheld electronic magnifier according to claim 1, wherein the handle is rotatable about the first hinge axis between a closed position, where the two-axis hinge assembly is substantially parallel to the camera face, and an open position, where the two-axis hinge assembly is inclined relative to the camera face.

3. The handheld electronic magnifier according to claim 2, wherein, in the open position the two-axis hinge assembly is inclined at an inclination angle of about 38 degrees relative to the camera face.

4. The handheld electronic magnifier according to claim 1, wherein the handle is rotatable about the second hinge axis between a retracted state, where the handle is side-by-side adjacent and lengthwise parallel to the longitudinal hinge member, and a deployed state, where the handle is flipped away from the longitudinal hinge member.

5. The handheld electronic magnifier according to claim 4, wherein the retracted and deployed states are separated from each other by about 180 degrees.

6. The handheld electronic magnifier according to claim 1, wherein the handle is rotatable about the first hinge axis between a closed position, where the two-axis hinge assembly is substantially parallel to the camera face, and an open position, where the two-axis hinge assembly is inclined relative to the camera face, and wherein the handle is rotatable about the second hinge axis between a retracted state, where the handle is side-by-side adjacent and lengthwise parallel to the longitudinal hinge member, and a deployed state, where the handle is flipped away from longitudinal hinge member.

7. The handheld electronic magnifier according to claim 6, operable in any one of a plurality of use modes comprising:
a compact mode, wherein the handle is in the closed position and in the retracted state;
a desktop mode, wherein the handle is in the open position for being placed on a working surface; and
a grasping mode, wherein the handle is in the deployed state for being held by a user.

8. The handheld electronic magnifier according to claim 6, wherein the camera face comprises a recessed portion configured to receive therein the handle when the handle is in the closed position and in the retracted state.

9. The handheld electronic magnifier according to claim 6, wherein, in the retracted state, the handle lies entirely outside of the field of view of the camera.

10. The handheld electronic magnifier according to claim 1, wherein the longitudinal and transverse hinge members are connected to each other at respective proximal ends thereof such that the two-axis hinge assembly has an L-shaped arrangement with a first arm defined by the longitudinal hinge member and a second arm defined by the transverse hinge member.

11. The handheld electronic magnifier according to claim 1, wherein the two-axis hinge assembly further comprises:
   a first detent mechanism operatively connected between the longitudinal hinge member and the casing for releasably locking the longitudinal hinge member at one of a plurality of discrete first angular positions relative to the casing; and
   a second detent mechanism operatively connected between the transverse hinge member and the handle for releasably locking the handle at one of a plurality of discrete second angular positions relative to the transverse hinge member.

12. The handheld electronic magnifier according to claim 11, wherein the first and second detent mechanisms are spring-loaded detent mechanisms.

13. The handheld electronic magnifier according to claim 1, wherein the longitudinal hinge member is connected to the camera face along a lengthwise edge thereof.

14. The handheld electronic magnifier according to claim 1, wherein the transverse hinge member is connected to the handle along a widthwise edge thereof.

15. The handheld electronic magnifier according to claim 1, further comprising a processing unit having a perspective correction module configured to perform a perspective correction to the image acquired by the camera.

* * * * *